United States Patent
Yamada

(10) Patent No.: US 9,713,190 B2
(45) Date of Patent: Jul. 18, 2017

(54) SYSTEMS AND METHODS FOR MULTI-CONNECTIVITY OPERATION

(71) Applicant: Sharp Laboratories of America, Inc., Camas, WA (US)

(72) Inventor: Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 180 days.

(21) Appl. No.: 14/106,583

(22) Filed: Dec. 13, 2013

(65) Prior Publication Data

US 2015/0173120 A1 Jun. 18, 2015

(51) Int. Cl.
| | |
|---|---|
| *H04W 76/04* | (2009.01) |
| *H04W 36/00* | (2009.01) |
| *H04W 76/02* | (2009.01) |
| *H04W 72/00* | (2009.01) |

(52) U.S. Cl.
CPC ..... *H04W 76/046* (2013.01); *H04W 36/0072* (2013.01); *H04W 76/021* (2013.01); *H04W 76/025* (2013.01); *H04W 72/00* (2013.01); *H04W 76/028* (2013.01); *H04W 76/04* (2013.01)

(58) Field of Classification Search
CPC ........... H04W 36/0072; H04W 76/046; H04W 76/021; H04W 88/06; H04W 72/042; H04W 76/025; H04W 36/0055; H04W 76/04; H04W 5/001
See application file for complete search history.

(56) References Cited

U.S. PATENT DOCUMENTS

| | | | | |
|---|---|---|---|---|
| 9,078,241 B2* | 7/2015 | Yamada | ............ | H04W 76/025 |
| 2011/0134774 A1* | 6/2011 | Pelletier | ............ | H04W 52/365 370/252 |
| 2011/0292894 A1* | 12/2011 | Wu | ............ | H04L 1/1812 370/329 |
| 2012/0106510 A1* | 5/2012 | Kuo | ............ | H04W 76/064 370/331 |
| 2012/0207130 A1* | 8/2012 | Jang | ............ | H04W 8/24 370/331 |
| 2013/0044668 A1* | 2/2013 | Purnadi | ............ | H04W 36/0055 370/312 |

(Continued)

OTHER PUBLICATIONS

3GPP, 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects, Release 12, 3GPP TR 36.842 V1.0.0, Nov. 2013, RP-131710.*

(Continued)

*Primary Examiner* — Ricky Ngo
*Assistant Examiner* — Michael Phillips
(74) *Attorney, Agent, or Firm* — Austin Rapp

(57) ABSTRACT

A method for receiving a radio resource control (RRC) message by a user equipment (UE) is described. The method includes receiving an RRC connection reconfiguration message including mobility control information. In response to receiving the RRC connection reconfiguration message including mobility control information, a medium access control (MAC) entity of a secondary cell group (SCG) is released if any MAC entity of the SCG is established. In response to receiving the RRC connection reconfiguration message including mobility control information, a MAC entity of a master cell group (MCG) is reset.

15 Claims, 15 Drawing Sheets

(56) References Cited

U.S. PATENT DOCUMENTS

| | | | |
|---|---|---|---|
| 2014/0056243 A1* | 2/2014 | Pelletier | H04W 74/04 370/329 |
| 2014/0293903 A1* | 10/2014 | Kuo | H04W 24/02 370/329 |
| 2014/0334448 A1* | 11/2014 | Langereis | H04W 36/0072 370/331 |
| 2015/0043492 A1* | 2/2015 | Baek | H04W 56/0005 370/329 |
| 2015/0055621 A1* | 2/2015 | Koskinen | H04W 36/18 370/331 |
| 2015/0117183 A1* | 4/2015 | Heo | H04L 5/0032 370/228 |
| 2015/0156810 A1* | 6/2015 | Wu | H04W 24/04 370/228 |
| 2015/0208458 A1* | 7/2015 | Pelletier | H04W 72/0453 370/329 |
| 2015/0312947 A1* | 10/2015 | Park | H04L 5/0098 370/329 |
| 2015/0319801 A1* | 11/2015 | Lee | H04W 56/00 370/329 |
| 2015/0365849 A1* | 12/2015 | Gao | H04W 36/0016 455/436 |
| 2016/0007237 A1* | 1/2016 | Jung | H04W 24/00 455/438 |
| 2016/0057660 A1* | 2/2016 | Hong | H04W 36/0072 455/436 |

OTHER PUBLICATIONS

3GPP, LTE; Evolved Universal Terrestrial Radio Access (E-UTRA); Radio Resource Control (RRC); Protocol specification (3GPP TS 36.331 version 11.3.0 Release 11), ETSI TS 136 331 V11.3.0, Apr. 2013, pp. 51-54.*

3GPP TR 36.842 V1.0.0, Evolved Universal Terrestrial Radio Access (E-UTRA); Study on Small Cell Enhancements for E-UTRA and E-UTRAN—Higher layer aspects, (Release 12), Nov. 2013.

3GPP TR 36.932 V12.1.0, Technical Specification Group Radio Access Network; Scenarios and requirements for small cell enhancements for E-UTRA and E-UTRAN (Release 12), Mar. 2013.

3GPP TS 36.300 V11.7.0, Evolved Universal Terrestrial Radio Access (E-UTRA) and Evolved Universal Terrestrial Radio Access Network (E-UTRAN); Overall description; Stage 2, (Relesase 11), Sep. 2013.

NTT Docomo, Inc., "New Study Item Description: Small Cell enhancements for E-UTRA and E-UTRAN—Higher-layer aspects," 3GPP TSG-RAN WG1 Meeting #58, RP-122033, Barcelona, Spain, Dec. 4-7, 2012.

ETRI, "Consideration on the RA result indication to the MeNB," 3GPP TSG-RAN WG2 #84, R2-133889, San Francisco, USA, Nov. 11-15, 2013.

International Search Report issued for International Patent Application No. PCT/JP2014/006149 on Mar. 17, 2015.

* cited by examiner

SYSTEMS AND METHODS FOR MULTI-CONNECTIVITY OPERATION

TECHNICAL FIELD

The present disclosure relates generally to communication systems. More specifically, the present disclosure relates to systems and methods for multi-connectivity operation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

DETAILED DESCRIPTION

Figure 1:
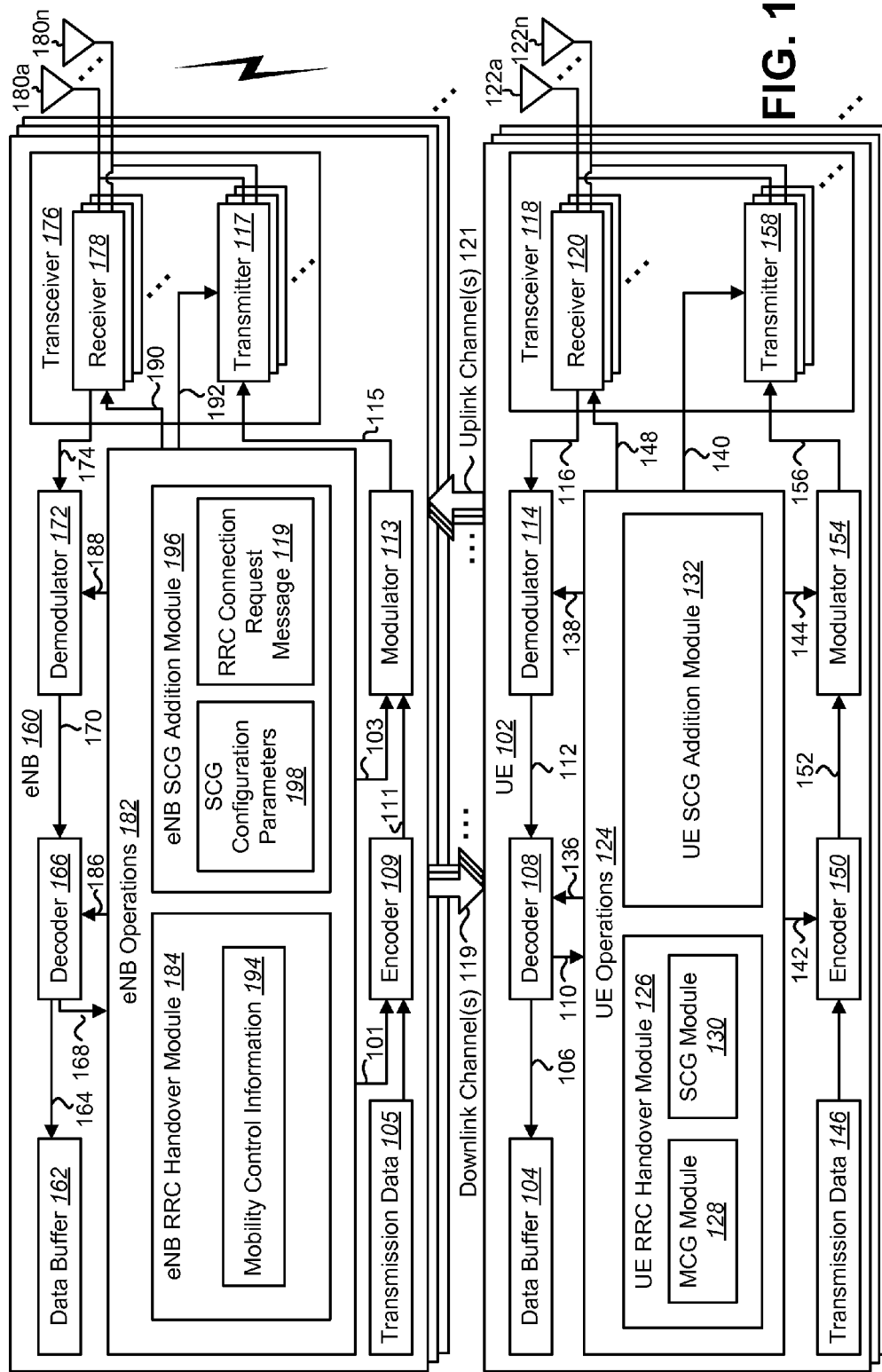
FIG. 1 is a block diagram illustrating one configuration of one or more evolved Node Bs (eNBs) and one or more user equipments (UEs) in which systems and methods for multi-connectivity operation may be implemented.

A method for receiving an RRC message by a UE is described. The method includes receiving an RRC connection reconfiguration message including mobility control information. In response to receiving the RRC connection reconfiguration message including mobility control information, a medium access control (MAC) entity of a secondary cell group (SCG) is released if any MAC entity of the SCG is established. In response to receiving the RRC connection reconfiguration message including mobility control information, a MAC entity of a master cell group (MCG) is reset.

In response to receiving the RRC connection reconfiguration message including mobility control information, the method may also include re-establishing radio link control (RLC) entities for all radio bearers (RBs) that are established for the MCG. RLC entities for all RBs that are established for the SCG may be released, if any RLC entity of the SCG is established.

In response to receiving the RRC connection reconfiguration message including mobility control information, the method may also include re-establishing packet data convergence protocol (PDCP) entities for all RBs that are established for the MCG. PDCP entities for all RBs that are established for the SCG may be released, if any PDCP entity of the SCG is established.

A UE for receiving an RRC message is also described. The UE includes a processor and memory in electronic communication with the processor. Instructions stored in the memory are executable to receive an RRC connection reconfiguration message including mobility control information. In response to receiving the RRC connection reconfiguration message including mobility control information a MAC entity of a SCG is released if any MAC entity of the SCG is established. In response to receiving the RRC connection reconfiguration message including mobility control information, a MAC entity of a MCG is reset.

A non-transitory, tangible computer-readable medium for receiving RRC message by a UE is also described. The computer-readable medium includes executable instructions for receiving an RRC connection reconfiguration message including mobility control information. In response to receiving the RRC connection reconfiguration message including mobility control information a MAC entity of a SCG is released if any MAC entity of the SCG is established. In response to receiving the RRC connection reconfiguration message including mobility control information, a MAC entity of a MCG is reset.

Another method for receiving an RRC message by a UE is described. The method includes receiving an RRC connection reconfiguration message including SCG configuration parameters for SCG addition. In response to receiving the RRC connection reconfiguration message including SCG configuration parameters for SCG addition, the method also includes ordering, by an RRC of the UE, a MAC of the SCG of the UE to initiate a random access procedure.

The random access procedure may include a contention resolution. If the random access procedure was initiated by the RRC order and a physical downlink control channel (PDCCH) transmission is addressed to a cell-radio network temporary identifier (C-RNTI) of the SCG of the UE, then the contention resolution may be considered successful. The random access procedure may also be considered successfully completed.

A method for sending an RRC message by an evolved Node B (eNB) is also described. The method includes sending an RRC connection reconfiguration message including SCG configuration parameters for SCG addition to a UE. The method also includes controlling a random access procedure initiated by the UE.

The method may also include sending PDCCH transmission that is addressed to a C-RNTI of the SCG of the UE. The PDCCH transmission may cause the UE to consider a random access procedure successfully completed. The method may further include considering the random access procedure concerning the SCG addition for the UE successfully completed.

A UE for receiving an RRC message is also described. The UE includes a processor and memory in electronic communication with the processor. Instructions stored in the memory are executable to receive an RRC connection reconfiguration message including SCG configuration parameters for SCG addition. In response to receiving the RRC connection reconfiguration message including SCG configuration parameters for SCG addition, the instructions are further executable to order, by an RRC of the UE, a MAC of the SCG of the UE to initiate a random access procedure.

An eNB for sending an RRC message is also described. The eNB includes a processor and memory in electronic communication with the processor. Instructions stored in the memory are executable to send an RRC connection reconfiguration message including SCG configuration parameters for SCG addition to a UE. The instructions are also executable to control a random access procedure initiated by the UE.

A non-transitory, tangible computer-readable medium for receiving an RRC message by a UE is also described. The computer-readable medium includes executable instructions for receiving an RRC connection reconfiguration message including SCG configuration parameters for SCG addition. In response to receiving the RRC connection reconfiguration message including SCG configuration parameters for SCG addition, the instructions are further executable for ordering, by an RRC of the UE, a MAC of the SCG of the UE to initiate a random access procedure.

A non-transitory, tangible computer-readable medium for sending an RRC message by an eNB is also described. The computer-readable medium includes executable instructions for sending an RRC connection reconfiguration message including SCG configuration parameters for SCG addition to a UE. The instructions are also executable for controlling a random access procedure initiated by the UE.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA, E-UTRAN overall description, a "cell" is defined as a "combination of downlink and optionally uplink resources." The linking between the carrier frequency of the downlink resources and the carrier frequency of the uplink resources may be indicated in system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for multi-connectivity operation. This may be done in the context of an evolved universal terrestrial radio access network (E-UTRAN). For example, multi-connectivity operation between a user equipment (UE) and two or more eNBs on an E-UTRAN is described. In one configuration, the two or more eNBs may have different schedulers.

The systems and methods described herein may enhance the efficient use of radio resources in multi-connectivity operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB.

However, in a small cell deployment scenario, each node (e.g., eNB, RRH, etc.) may have its own independent scheduler. To maximize the efficiency of radio resources utilization of both nodes, a UE may connect to two or more nodes that have different schedulers.

In one configuration, for a UE to connect to two nodes (e.g., eNBs) that have different schedulers, multi-connectivity between the UE and E-UTRAN may be utilized. For example, in addition to Rel-11 operation, a UE operating according to the Rel-12 standard may be configured with multi-connectivity (which may also be referred to as dual connectivity, inter-eNB carrier aggregation, multi-flow, multi-cell cluster, multi-Uu, etc.). Because a maximum of two connections are currently considered, terminology of "dual connectivity" may be used. The UE may connect to the E-UTRAN with multiple Uu interfaces, if configured. For instance, the UE may be configured to establish one or more additional radio interfaces by using one radio interface. Hereafter, one node is referred to as master eNB (MeNB) and another node is referred to as secondary eNB (SeNB).

In multi-connectivity, an RRC procedure for secondary cell group (SCG) addition may be defined. Because the medium access control (MAC), radio link control (RLC) and packet data convergence protocol (PDCP) for the SCG are added at SCG addition, handover procedure needs to be modified. Furthermore, because there is no RRC message transmission on the SCG, initiation of a random access procedure may need to change.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for multi-connectivity operation may be implemented. The one or more UEs 102 may communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that one or more of the UEs 102 described herein may be implemented in a signal device in some configurations. For example, multiple UEs 102 may be combined into a single device in some implementations. Furthermore, one or more of the eNBs 160 described herein may be implemented in a single device in some configurations. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a Cell-specific reference signal (CRS), and a CSI reference channel (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE RRC handover module 126 and a UE SCG addition module 132. The UE operations module 124 may include physical (PHY) entities, MAC entities, RLC entities, PDCP entities, and an RRC entity.

The UE operations module 124 may provide the benefit of utilizing the radio resources of a master cell group (MCG) and a SCG efficiently. When a SCG is added, the two cell groups may be configured. One cell group is an MCG and another is an SCG. An MCG may provide a signaling radio bearer (SRB) to exchange an RRC message. An SCG may be added via the MCG. The MCG may provide a radio connection between the UE 102 and a master eNB (MeNB) 160. The SCG may provide a radio connection between the UE 102 and a secondary eNB (SeNB) 160.

The UE RRC handover module 126 may receive an RRC connection reconfiguration message (also referred to as RRCConnectionReconfiguration) from a source MeNB 160. Upon receipt of the RRC connection reconfiguration message, if the RRC connection reconfiguration message includes mobility control information 194 (e.g., mobility-ControlInfo) and the UE 102 is able to comply with the configuration included in the RRC connection reconfiguration message, the UE 102 may start synchronizing to the downlink of a target eNB 160.

The UE RRC handover module 126 may include a MCG module 128 and an SCG module 130. The MCG module 128 and the SCG module 130 may handle the PDCP, RLC and MAC entit(ies) of the MCG and the SCG separately. The MCG module 128 may reset the MAC entity of the MCG. The MCG module 128 may re-establish PDCP entities for all radio bearers (RBs) that are established for the MCG. Furthermore, the MCG module 128 may re-establish RLC entities for all RBs that are established for the MCG.

The SCG module 130 may release the SCG. The SCG module 130 may release the MAC entity of the SCG, if any MAC entity of the SCG is established. The SCG module 130 may release the PDCP entities for all RBs that are established for the SCG, if any PDCP entity of the SCG is established. Furthermore, the SCG module 130 may release RLC entities for all RBs that are established for SCG, if any RLC entity of the SCG is established.

The UE RRC handover module 126 may submit an RRC connection reconfiguration complete message to lower layers of the MCG for transmission to the target eNB 160. By this submission, the MAC entity of the MCG of the UE 102 may initiate a random access procedure.

The UE SCG addition module 132 may perform an SCG addition procedure. The UE SCG addition module 132 may receive an RRC connection reconfiguration message. Upon receipt of the RRC connection reconfiguration message, if the RRC connection reconfiguration message includes SCG configuration parameters 198 for SCG addition and the UE 102 is able to comply with the configuration included in this message, then the UE SCG addition module 132 may start synchronizing to the DL of the target cell of the SCG.

The UE SCG addition module 132 may establish the MAC entity of the SCG. The UE SCG addition module 132 may apply the value of the newUE-Identity as the C-RNTI for the SCG. The UE SCG addition module 132 may configure lower layers of the SCG in accordance with a received RRC common message for the SCG.

The UE SCG addition module 132 may order, by an RRC of the UE 102, a MAC of the SCG of the UE 102 to initiate a random access procedure. It should be noted that for the SCG addition procedure, the UE 102 may not submit any RRC message to lower layers of the SCG. Therefore, the same procedure for initiating a random access procedure during handover (e.g., the submission of the RRC connection reconfiguration complete message) may not be used for SCG addition. Instead, the RRC of the UE 102 may order (e.g., instruct) the MAC of the SCG of the UE 102 to initiate a random access procedure.

The UE operations module 124 may provide information 148 to the one or more receivers 120. For example, the UE operations module 124 may inform the receiver(s) 120 when or when not to receive transmissions based on the RRC connection reconfiguration message.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include the RRC reconfiguration complete message on the MCG and the reconfiguration complete indication on the SCG.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of an eNB RRC handover module 184 and an eNB SCG addition module 196. The eNB operations module 182 may provide the benefit of utilizing the radio resources of the MCG and the SCG efficiently. The eNB operations module 182 may include PHY entities, MAC entities, RLC entities, PDCP entities, and an RRC entity.

During a handover procedure, the eNB RRC handover module 184 may send an RRC connection reconfiguration message to the UE 102. The RRC connection reconfiguration message may include mobility control information 194. Based on the RRC connection reconfiguration message that includes mobility control information 194, the UE 102 may synchronize to the downlink of a target eNB 160. The UE 102 may initiate a random access procedure with the target eNB 160.

Figure 11:
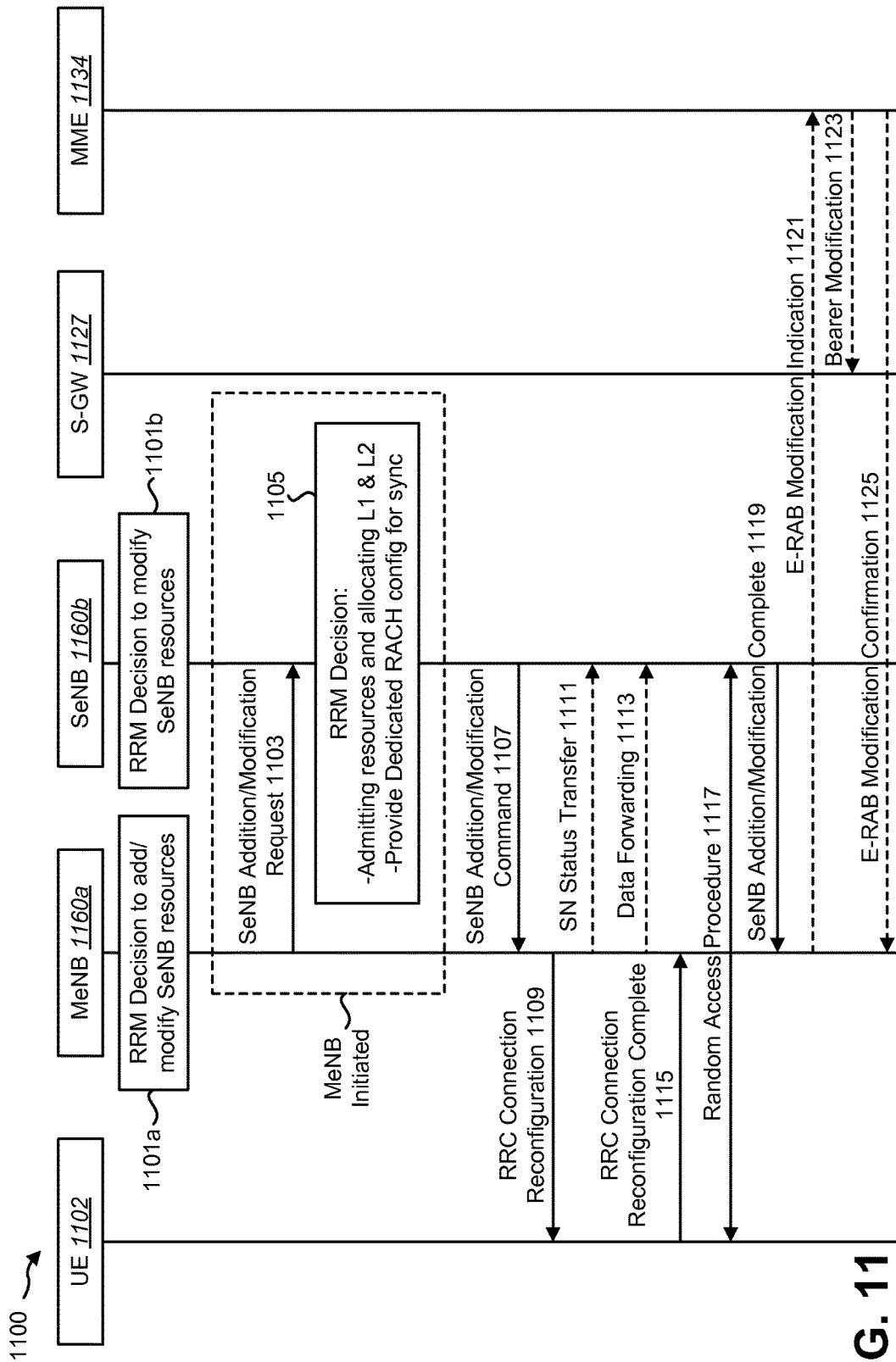
FIG. 11 is a thread diagram illustrating one configuration of secondary evolved Node B (SeNB) addition and modification.

The eNB SCG addition module 196 may perform an SCG addition procedure. The eNB SCG addition module 196 may send an RRC connection reconfiguration message to the UE 102. The RRC connection reconfiguration message may include SCG configuration parameters 198 for SCG addition. The SeNB provides SCG configuration parameters 198 for SCG addition to the MeNB. The SCG configuration parameters 198 for SCG addition may be provided in an SeNB Addition/Modification Command 1107 as indicated in FIG. 11. The MeNB may send an RRC connection reconfiguration message to the UE 102. The SeNB may handle a random access procedure for the SCG.

Separation between the eNB RRC handover module 184 and the eNB SCG addition module 196 does not necessarily preclude generating an RRC connection reconfiguration message including the mobility control information 194 and SCG configuration parameters 198 for SCG addition. It is possible for the eNB operations module 182 to generate an RRC connection reconfiguration message including the mobility control information 194 and SCG configuration parameters 198 for SCG addition. The SCG addition procedure may be the same as the SCG modification procedure. The SCG modification procedure may be realized by SCG release and SCG addition.

The eNB operations module 182 may control a random access procedure initiated by the UE 102. In one example, the SCG addition procedure and the random access procedure may be independent. In another example, SCG addition procedure may include the random access procedure. The eNB operations module 182 may handle both the SCG addition procedure and the random access procedure. How the eNB operations module 182 coordinates with the eNB SCG addition module 196 internally is not limited to the following description.

The eNB SCG addition module 196 may receive a reconfiguration complete indication in a random access procedure. The eNB SCG addition module 196 may receive the reconfiguration complete indication from the UE 102 on an uplink shared channel (UL-SCH). The reconfiguration complete indication may be a message 3 (Msg3) that includes a C-RNTI MAC control element (C-RNTI MAC CE). The reconfiguration complete indication may be a MAC message that includes a specific MAC CE.

The eNB SCG addition module 196 may send a PDCCH transmission that is addressed to the C-RNTI of the SCG of the UE 102. The PDCCH transmission may cause the UE 102 to consider the random access procedure successfully completed. The condition that causes the UE 102 to consider the random access procedure successfully completed may be the PDCCH transmission not only that is addressed to the C-RNTI but also that contains an UL grant for a new transmission. Upon sending the PDCCH transmission, the eNB SCG addition module 196 may consider the random access procedure concerning the SCG addition for the UE 102 successfully completed.

The eNB operations module 182 may provide information 190 to the one or more receivers 178. For example, the eNB operations module 182 may inform the receiver(s) 178 when or when not to receive transmissions based on the RRC messages.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

In general, the eNB operations module 182 may enable the eNB 160 to communicate with one or more network nodes (e.g., a mobility management entity (MME), serving gateway (S-GW), eNBs). The eNB operations module 182 may also generate a RRC connection reconfiguration message to be signaled to the UE 102. The RRC connection reconfiguration message may or may not include mobility control information 194 and/or SCG configuration parameters 198 for SCG addition. The eNB operations module 182 may send, to the other eNB 160, the RRC connection reconfiguration message to be signaled to the UE 102. For example, the other eNB 160 may receive the mobility control information 194 and/or SCG configuration parameters 198 for SCG addition from the eNB 160 as a container. The eNB 160 may generate a RRC connection reconfiguration message that may include the received container and may send the RRC connection reconfiguration message to the UE 102. The eNB 160 may just send a RRC connection reconfiguration message included in the received container.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
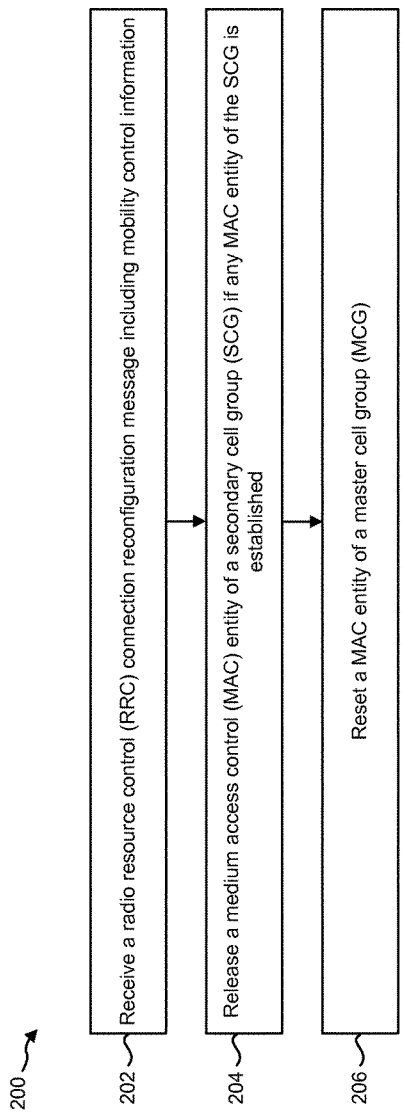
FIG. 2 is a flow diagram illustrating one implementation of a method for receiving a radio resource control (RRC) message by a UE.

FIG. 2 is a flow diagram illustrating one implementation of a method 200 for receiving a radio resource control (RRC) message by a UE 102. In a handover procedure, a source MeNB 160 and a target MeNB 160 may be involved for the UE 102. The UE 102 may receive 202 an RRC connection reconfiguration message (also referred to as RRCConnectionReconfiguration) from the source MeNB 160. Upon receipt of the RRC connection reconfiguration message, if the RRC connection reconfiguration message includes mobility control information 194 (e.g., mobilityControlInfo) and the UE 102 is able to comply with the configuration included in the RRC connection reconfiguration message, the UE 102 may start a timer (e.g., timer T304) with the timer value set to a value included in the mobility control information 194. In one configuration, the timer may be set to a t304 value included in the mobility control information 194.

The UE 102 may start synchronizing to the downlink of the target PCell. The UE 102 may handle the PDCP, RLC and MAC entit(ies) of the MCG and the SCG separately. The UE 102 may or may not release the SCG. The UE 102 may release 204 the MAC entity of the SCG, if any MAC entity of the SCG is established. In another example, the UE 102 may reset 204 the MAC entity of the SCG, if any MAC entity of the SCG is established. The UE 102 may release the PDCP entities for all RBs that are established for the SCG, if any PDCP entity of the SCG is established. The UE 102 may release RLC entities for all RBs that are established for SCG, if any RLC entity of the SCG is established.

The UE 102 may reset 206 the MAC entity of the MCG. The UE 102 may re-establish PDCP entities for all radio bearers (RBs) that are established for the MCG. The UE 102 may re-establish RLC entities for all RBs that are established for the MCG.

The UE 102 may apply the value of the newUE-Identity as the cell-radio network temporary identifier (C-RNTI) for the MCG. The "newUE-Identiy" may be an information element that is included in the mobility control information 194 that indicates a new UE identity. The UE 102 may configure lower layers (e.g., at least one of a PDCP layer, an RLC layer, a MAC layer or a PHY layer) of the MCG in accordance with a received RRC radio resource configuration common message (e.g., radioResourceConfigCommon) . The UE 102 may configure lower layers of the MCG in accordance with any additional fields, not covered in the RRC radio resource configuration common message, if included in the received mobility control information 194. For example, a RACH-ConfigDedicated message, which is optionally included in the mobility control information 194, may be provided to the MAC entity for the MCG.

The UE 102 may submit an RRC connection reconfiguration complete message (e.g., RRCConnectionReconfigurationComplete) to lower layers of the MCG for transmission. By this submission, the MAC entity of the MCG of the UE 102 may initiate a random access procedure. In other words, the MAC entity of the MCG may detect the arrival of new uplink data and may trigger a buffer status report causing a scheduling request (SR) trigger. In one configuration, the MAC entity of the MCG of the UE 102 may use a RACH-ConfigDedicated parameter including the ra-PreambleIndex and the ra-PRACH-MaskIndex.

The SR may be used for requesting UL-SCH resources for a new transmission. When an SR is triggered, the SR may be considered as pending until it is cancelled. Pending SR(s) may be cancelled and an SR prohibit timer (e.g., sr-ProhibitTimer) may be stopped when a MAC PDU is assembled and the MAC PDU includes a BSR (Buffer Status Report). The BSR report may contain buffer status information up to (and including) the last event that triggered the BSR, or when an UL grant(s) can accommodate all pending data available for transmission. If an SR is triggered and there is no other SR pending, then the UE 102 may set an SR counter (e.g., SR_COUNTER) to 0. As long as one SR is pending, the UE 102 may implement the SR procedure of Listing (1) for each transmission time interval (TTI).

---

Listing (1)

If no UL-SCH resources are available for a transmission in this TTI:
    If the UE 102 has no valid PUCCH resource for SR configured
    in any TTI:
        Initiate a random access procedure on the PCell and cancel all
           pending SRs;
    Else if the UE 102 has a valid PUCCH resource for SR configured
        for this TTI and if this TTI is not part of a measurement gap
        and if the sr-ProhibitTimer is not running:
        If SR_COUNTER < dsr-TransMax:
           Increment SR_COUNTER by 1;

Listing (1)

```
         Instruct the physical layer to signal the SR on PUCCH;
         Start the sr-ProhibitTimer.
      Else:
         Notify the RRC to release the PUCCH/SRS for all serving
            cells;
      Clear any configured downlink assignments and uplink
         grants;
      Initiate a random access procedure on the PCell and cancel
         all pending SRs.
```

Based on the scheduling request procedure, the MAC entity of the MCG will initiate a random access procedure because, in this case, the UE 102 has no valid physical uplink control channel (PUCCH) resource for a scheduling request (SR) configured in any transmission time interval (TTI). It should be noted that in this case there is no direct instruction to initiate a random access procedure from the RRC layer of the UE 102 to the MAC layer. If the MAC of the MCG successfully completes the random access procedure, the UE 102 may stop the timer (e.g., timer T304) and the RRC connection reconfiguration procedure may end.

If the timer expires, then a handover failure may have occurred because the MAC of the MCG could not successfully complete the random access procedure by the timer expiration. The UE 102 may initiate a connection re-establishment procedure. Upon initiating the connection re-establishment procedure, the RRC connection reconfiguration procedure may end.

Figure 3:
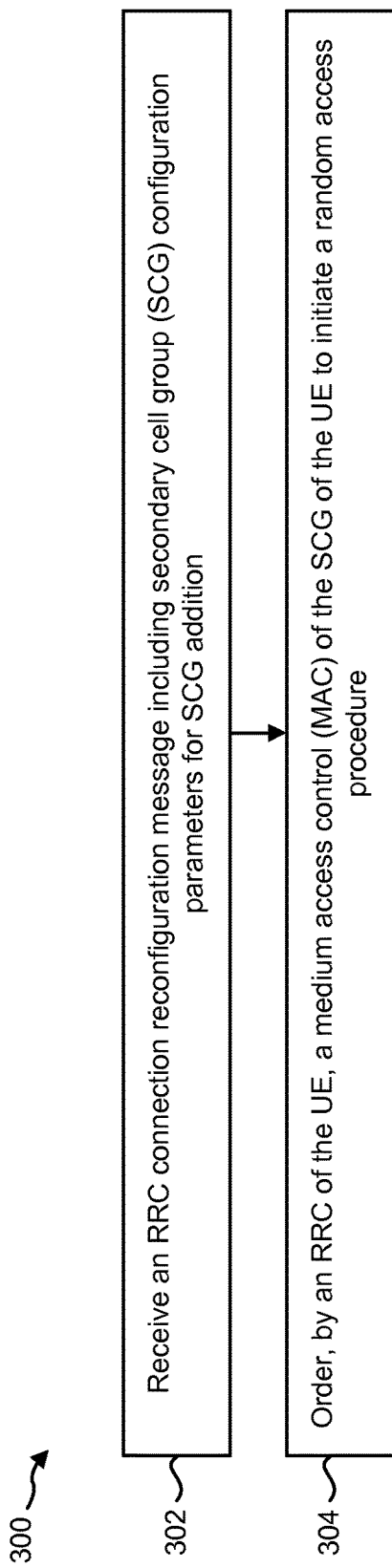
FIG. 3 is a flow diagram illustrating one implementation of a method for receiving an RRC message by a UE.

FIG. 3 is a flow diagram illustrating one implementation of a method 300 for receiving an RRC message by a UE 102. In an SeNB addition procedure (also referred to as an SCG addition procedure), an RRC connection reconfiguration message (e.g., RRCConnectionReconfiguration) is also used, as described in connection with the handover procedure of FIG. 2.

The UE 102 may receive 302 the RRC connection reconfiguration message. Upon receipt of the RRC connection reconfiguration message, if the RRC connection reconfiguration message includes SCG configuration parameters 198 for SCG addition and the UE 102 is able to comply with the configuration included in this message, then the UE 102 may start synchronizing to the DL of the target cell of the SCG. The target cell of the SCG may also be referred to as a PCell-like cell, PCell, PSCell, SPCell, SCG PCell, etc. The UE 102 may establish the MAC entity of the SCG. The UE 102 may apply the value of the newUE-Identity as the C-RNTI for the SCG. The newUE-Identity may be an information element that is included in the SCG configuration parameters 198 for SCG addition and indicates a new UE Identity for the SCG. The UE 102 may configure lower layers of the SCG in accordance with the received RRC radio resource configuration common message (e.g., radioResourceConfigCommon) for the SCG.

The UE 102 may configure lower layers (e.g., at least one of a PDCP layer, an RLC layer, a MAC layer or a PHY layer) of the SCG in accordance with any additional fields, not included in the radio resource configuration common message for the SCG, if included in the received SCG configuration parameters 198. For example, a RACH-ConfigDedicated message, which is optionally included in SCG configuration parameters 198, may be provided to the MAC entity for the SCG.

The UE 102 may order 304, by an RRC of the UE 102, a MAC of the SCG of the UE 102 to initiate a random access procedure. It should be noted that for the SCG addition procedure, the UE 102 may not submit any RRC message to lower layers of the SCG. Therefore, the same procedure for initiating a random access procedure during handover (e.g., the submission of the RRC connection reconfiguration complete message) may not be used for SCG addition. Instead, the RRC of the UE 102 may order 304 (e.g., instruct) the MAC of the SCG of the UE 102 to initiate a random access procedure. Alternatively, the RRC of the UE 102 may instruct the MAC of the SCG of the UE 102 to trigger a buffer status report (BSR). The buffer status report may be delivered or transmitted by using a BSR MAC control element. The buffer status report may trigger a scheduling request, as described above in Listing (1). Based on a scheduling request procedure, the MAC of the SCG may initiate a random access procedure because, in this case, the UE 102 has no valid PUCCH resource for an SR configured in any TTI on the SCG.

Alternatively, the RRC of the UE 102 may instruct the MAC of the SCG of the UE 102 to trigger a specific MAC control element (e.g, reconfiguration complete indication). The specific MAC control element may trigger a scheduling request, as described above in Listing (1). Based on a scheduling request procedure, the MAC of the SCG may initiate a random access procedure because, in this case, the UE 102 has no valid PUCCH resource for an SR configured in any TTI on the SCG.

As part of the random access procedure, the UE 102 may send a reconfiguration complete indication on an UL-SCH. The reconfiguration complete indication may be an Msg3 message that includes a C-RNTI MAC CE. The reconfiguration complete indication may be a MAC control message that includes a specific MAC control element. Upon sending the Msg3, the UE 102 may monitor the PDCCH for a response from the eNB 160.

If the random access procedure was initiated by the RRC order and a PDCCH transmission from the eNB 160 is addressed to the C-RNTI of the SCG of the UE 102, the UE 102 may consider the contention resolution successful. The UE 102 may also considering the random access procedure successfully completed. The condition that causes the UE 102 to consider the random access procedure successfully completed may be the PDCCH transmission not only that is addressed to the C-RNTI but also that contains an UL grant for a new transmission.

Figure 4:
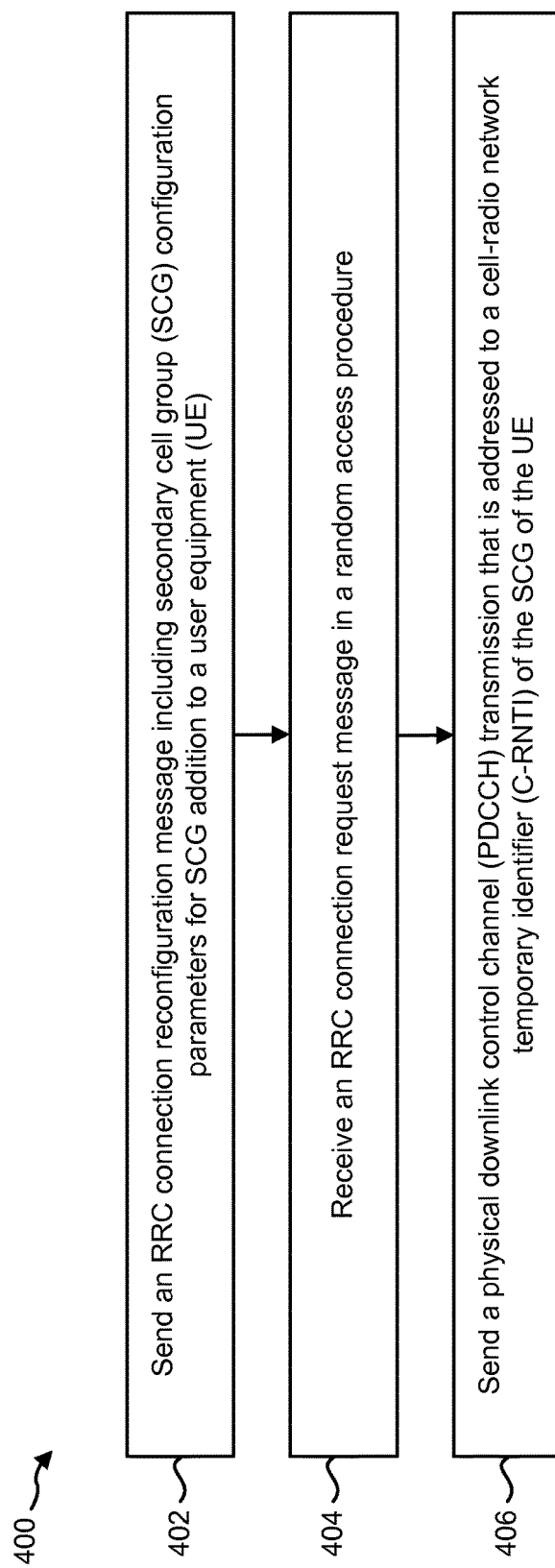
FIG. 4 is a flow diagram illustrating one implementation of a method for sending an RRC message by an eNB.

FIG. 4 is a flow diagram illustrating one implementation of a method 400 for sending an RRC message by an eNB 160. The method 400 may be performed as part of an SeNB addition procedure (also referred to as an SCG addition procedure). An eNB 160 may send 402 an RRC connection reconfiguration message to a UE 102. The RRC connection reconfiguration message may include SCG configuration parameters 198 for SCG addition, as described above in connection with FIG. 3.

The eNB may control a random access procedure initiated by the UE 102. The eNB 160 may receive 404 a random access preamble and a message 3 (Msg3) in a random access procedure. The eNB 160 may receive 404 the Msg3 from the UE 102 on an UL-SCH. The Msg3 message may be transmitted on an UL-SCH containing a C-RNTI MAC CE or a common control channel (CCCH) service data unit (SDU) as part of a contention resolution in the random access procedure.

The eNB 160 may send 406 a PDCCH transmission that is addressed to the C-RNTI of the SCG of the UE 102. The PDCCH transmission may cause the UE 102 to consider the random access procedure successfully completed. The condition that causes the UE 102 to consider the random access procedure successfully completed may be the PDCCH transmission not only that is addressed to the C-RNTI but also that contains an UL grant for a new transmission. Upon sending 406 the PDCCH transmission, the eNB 160 may consider the random access procedure concerning the SCG addition for the UE 102 successfully completed.

Figure 5:
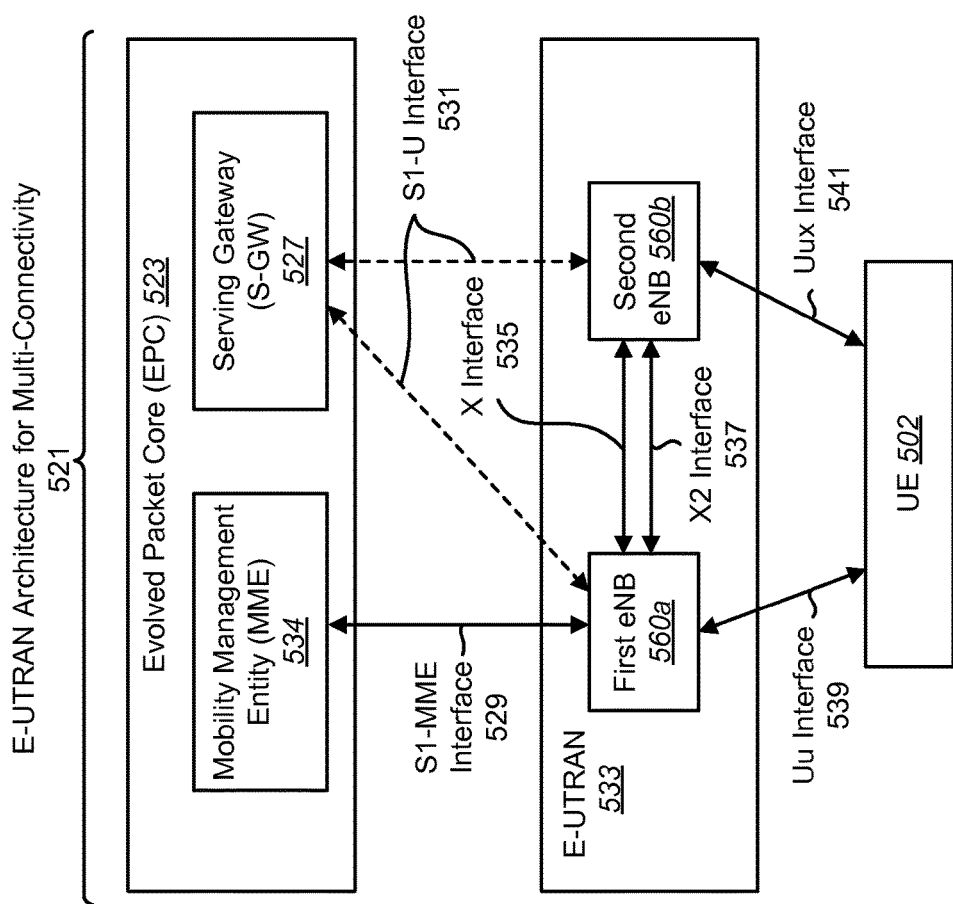
FIG. 5 is a block diagram illustrating configurations of Evolved Universal Terrestrial Radio Access Network (E-UTRAN) architecture in which systems and methods for multi-connectivity operation may be implemented.

FIG. 5 is a block diagram illustrating configurations of E-UTRAN architecture 521 in which systems and methods for multi-connectivity operation may be implemented. The UE 502 described in connection with FIG. 5 may be implemented in accordance with the UE 102 described in connection with FIG. 1. The eNBs 560*a-b* described in connection with FIG. 5 may be implemented in accordance with the eNB 160 described in connection with FIG. 1.

The E-UTRAN architecture for multi-connectivity 521 is one example of E-UTRAN architecture that may provide multi-connectivity for a UE 502. In this configuration, the UE 502 may connect to E-UTRAN 533 via a Uu interface 539 and a Uux interface 541. The E-UTRAN 533 may include a first eNB 560*a* and a second eNB 560*b*. The eNBs 560*a-b* may provide the E-UTRA user plane (PDCP/RLC/MAC/PHY) and control plane (RRC) protocol terminations toward the UE 502. The eNBs 560*a-b* may be interconnected with each other by an X2 interface 537. The S1 interface 529, 531 may support a many-to-many relation between MMEs 534, serving gateways 527 and eNBs 560*a-b*. The first eNB (e.g., MeNB) 560*a* and the second eNB (e.g., SeNB) 560*b* may also be interconnected with each other by means of one or more X interfaces 535, which may or may not be the same as the S1-MME 529 and/or X2 interface 537.

The eNBs 560 may host a variety of functions. For example, the eNBs 560 may host functions for radio resource management (e.g., radio bearer control, radio admission control, connection mobility control, dynamic allocation of resources to UEs 502 in both uplink and downlink (scheduling)). The eNBs 560 may also perform IP header compression and encryption of user data stream; selection of an MME 534 at UE 502 attachment when no routing to an MME 534 can be determined from the information provided by the UE 502; and routing of user plane data toward the serving gateway 527. The eNBs 560 may additionally perform scheduling and transmission of paging messages (originated from the MME 534); scheduling and transmission of broadcast information (originated from the MME or operation and maintenance (O&M)); measurement and measurement reporting configuration for mobility and scheduling; and scheduling and transmission of the public warning system (PWS) (which may include the earthquake and tsunami warning system (ETWS) and commercial mobile alert system (CMAS)) messages (originated from the MME 534). The eNBs 560 may further perform closed subscriber group (CSG) handling and transport level packet marking in the uplink.

The MME 534 may host a variety of functions. For example, the MME 534 may perform Non-Access Stratum (NAS) signaling; NAS signaling security; access stratum (AS) security control; inter core network (CN) node signaling for mobility between 3GPP access networks; and idle mode UE Reachability (including control and execution of paging retransmission). The MME 534 may also perform tracking area list management (for a UE 502 in idle and active mode); packet data network gateway (PDN GW) and S-GW selection; MME 534 selection for handovers with MME 534 change; and Serving GPRS Support Node (SGSN) selection for handovers to 2G or 3G 3GPP access networks. The MME 534 may additionally host roaming, authentication, and bearer management functions (including dedicated bearer establishment). The MME 534 may provide support for PWS (which includes ETWS and CMAS) message transmission, and may optionally perform paging optimization.

The S-GW 527 may also host the following functions. The S-GW 527 may host the local mobility anchor point for inter-eNB 560 handover. The S-GW 527 may perform mobility anchoring for inter-3GPP mobility; E-UTRAN idle mode downlink packet buffering and initiation of network triggered service request procedure; lawful interception; and packet routing and forwarding. The S-GW 527 may also perform transport level packet marking in the uplink and the downlink; accounting on user and QoS Class Identifier (QCI) granularity for inter-operator charging; and UL and DL charging per UE 502, packet data network (PDN), and QCI.

The radio protocol architecture of E-UTRAN 533 may include the user plane and the control plane. The user plane protocol stack may include PDCP, RLC, MAC and PHY sublayers. The PDCP, RLC, MAC and PHY sublayers (terminated at the eNB 560*a* on the network) may perform functions (e.g., header compression, ciphering, scheduling, ARQ and HARQ) for the user plane. PDCP entities are located in the PDCP sublayer. RLC entities are located in the RLC sublayer. MAC entities are located in the MAC sublayer. The PHY entities are located in the PHY sublayer.

The control plane may include a control plane protocol stack. The PDCP sublayer (terminated in eNB 560*a* on the network side) may perform functions (e.g., ciphering and integrity protection) for the control plane. The RLC and MAC sublayers (terminated in eNB on the network side) may perform the same functions as for the user plane. The RRC (terminated in eNB 560*a* on the network side) may perform the following functions. The RRC may perform broadcast functions, paging, RRC connection management, radio bearer (RB) control, mobility functions, UE 502 measurement reporting and control. The NAS control protocol (terminated in MME 534 on the network side) may perform, among other things, evolved packet system (EPS) bearer management, authentication, evolved packet system connection management (ECM)-IDLE mobility handling, paging origination in ECM-IDLE and security control.

The first eNB 560*a* and the second eNB 560*b* may be connected by the S1 interface 529, 531 to the EPC 523. The first eNB 560*a* may be connected to the MME 534 by the S1-MME interface 529. In one configuration, the second eNB 560*b* may be connected to the serving gateway 527 by the S1-U interface 531 (as indicated by a dashed line). The first eNB 560*a* may behave as the MME 534 for the second eNB 560*b* so that S1-MME interface 529 for the second eNB 560*b* may be connected (via the X interface 535, for instance) between the first eNB 560*a* and the second eNB 560*b*. Therefore, the first eNB 560*a* may appear to the second eNB 560*b* as an MME 534 (based on the S1-MME interface 529) and an eNB 560 (based on the X2 interface 537).

In another configuration, first eNB 560*a* may also be connected to the serving gateway 527 by the S1-U interface 531 (as indicated by a dashed line). Therefore, the second eNB 560*b* may not be connected to the EPC 523. The first eNB 560*a* may appear to the second eNB 560*b* as an MME 534 (based on the S1-MME interface 529), an eNB (based on the X2 interface 537), and an S-GW 527 (based on the 51-U interface 531). This architecture 521 may provide a single node S1 interface 529, 531 (e.g., connection) with the EPC 523 for the first eNB 560a and the second eNB 560b. By the single node connection with EPC 523, MME 534 S-GW 527, a change (e.g., handover) could be mitigated as long as the UE 502 is in the coverage of the first eNB 560a.

Figure 6:
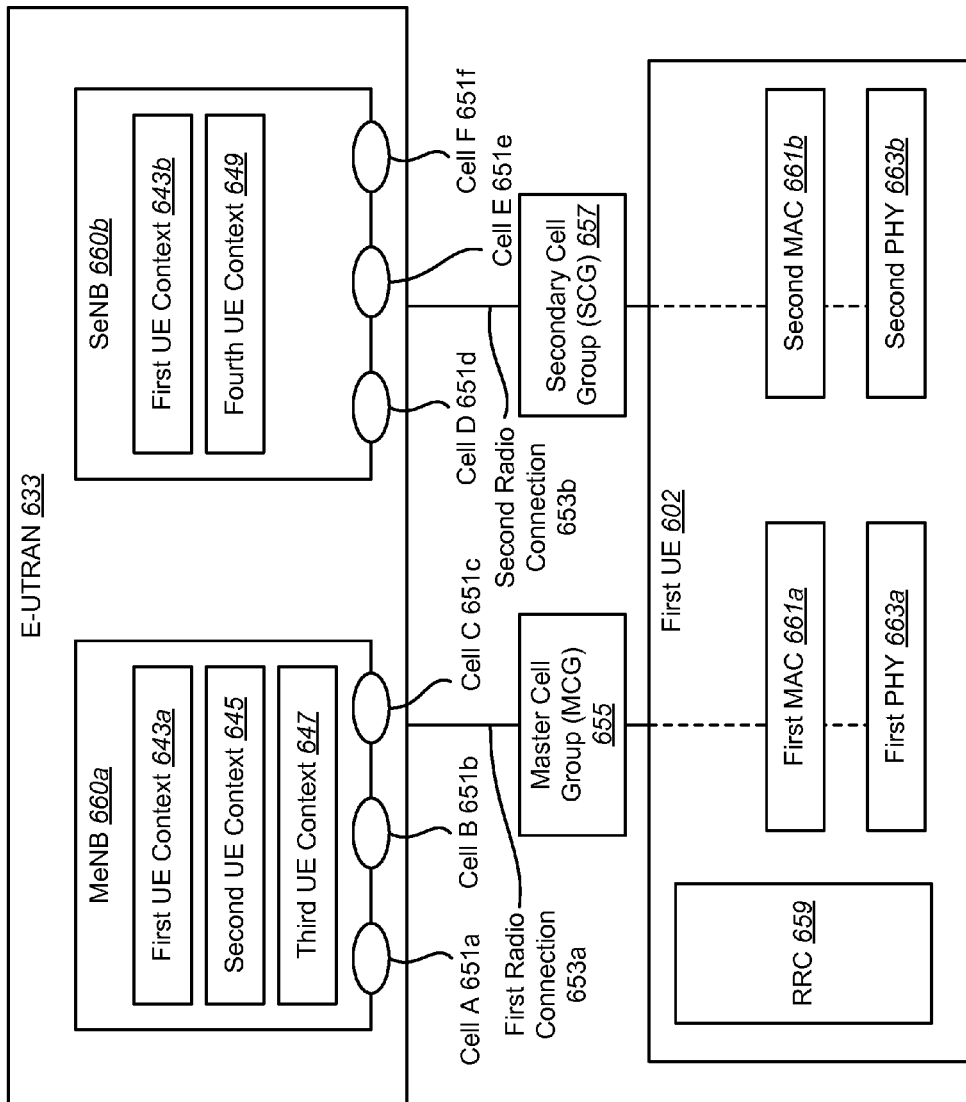
FIG. 6 is a block diagram illustrating one configuration of an E-UTRAN and a UE in which systems and methods for multi-connectivity operation may be implemented.

FIG. 6 is a block diagram illustrating one configuration of an E-UTRAN 633 and a UE 602 in which systems and methods for multi-connectivity operation may be implemented. The UE 602 and the E-UTRAN 633 described in connection with FIG. 6 may be implemented in accordance with corresponding elements described in connection with at least one of FIGS. 1 and 5.

In traditional carrier aggregation, a single eNB 660 is assumed to provide multiple serving cells 651 for a UE 602. Even in scenarios where two or more cells 651 may be aggregated (e.g., a macro cell aggregated with remote radio head (RRH) cells 651), the cells 651 may be controlled (e.g., scheduled) by a single eNB 660. However, in a small cell deployment scenario, each eNB 660 (e.g., node) may have its own independent scheduler. To utilize radio resources of both eNBs 660, the UE 602 may connect to both eNBs 660.

When carrier aggregation is configured, the UE 602 may have one RRC connection with the network. One radio interface may provide carrier aggregation. During RRC connection establishment, re-establishment and handover, one serving cell 651 may provide NAS mobility information (e.g., a tracking area identity (TAI)). During RRC connection re-establishment and handover, one serving cell 651 may provide a security input. This cell 651 may be referred to as the primary cell (PCell). In the downlink, the component carrier corresponding to the PCell may be the downlink primary component carrier (DL PCC), while in the uplink it may be the uplink primary component carrier (UL PCC).

Depending on UE 602 capabilities, one or more SCells may be configured to form together with the PCell a set of serving cells 651. In the downlink, the component carrier corresponding to a SCell may be a downlink secondary component carrier (DL SCC), while in the uplink it may be an uplink secondary component carrier (UL SCC).

The configured set of serving cells 651 for the UE 602, therefore, may consist of one PCell and one or more SCells. For each SCell, the usage of uplink resources by the UE 602 (in addition to the downlink resources) may be configurable. The number of DL SCCs configured may be larger than or equal to the number of UL SCCs and no SCell may be configured for usage of uplink resources only.

From a UE 602 viewpoint, each uplink resource may belong to one serving cell 651. The number of serving cells 651 that may be configured depends on the aggregation capability of the UE 602. The PCell may only be changed using a handover procedure (e.g., with a security key change and a random access channel (RACH) procedure). The PCell may be used for transmission of the PUCCH. Unlike the SCells, the PCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by an RRC 659. At intra-LTE handover, RRC 659 may also add, remove or reconfigure SCells for usage with a target PCell. When adding a new SCell, dedicated RRC signaling may be used for sending all required system information of the SCell (e.g., while in connected mode, UEs 602 need not acquire broadcasted system information directly from the SCells).

However, to connect to both eNBs 660 that have different schedulers, multi-connectivity between the UE 602 and E-UTRAN 633 may be required. In addition to Release-11 operation, a UE 602 operating according to Release-12 may be configured with multi-connectivity (which may also be called dual-connectivity, inter-node carrier aggregation, inter-node radio aggregation, multi-flow, multi-cell cluster, multi-Uu, etc.).

The UE 602 may connect to E-UTRAN 633 with multiple Uu interfaces 539, 541, if configured. For example, a UE 602 may be configured to establish an additional radio interface (e.g., radio connection 653) by using one radio interface (radio connection 653). Hereafter, one eNB 660 is referred to as a master eNB (MeNB) 660a, which may also be called a primary eNB (PeNB). Another eNB 660 is referred to as s secondary eNB (SeNB) 660b. The Uu interface 539 (which may be called primary Uu interface) is a radio interface between the UE 602 and the MeNB 660a. The Uux interface 541 (which may be called secondary Uu interface) is a radio interface between the UE 602 and the SeNB 660b.

In one configuration, the UE 602 may not be required to be aware of the MeNB 660a and SeNB 660b as long as the UE 602 is aware of multiple Uu interfaces 539, 541 with the E-UTRAN 415. Also, the E-UTRAN 415 may provide multiple Uu interfaces with the same or different eNBs 660.

In one configuration, the MeNB 660a and SeNB 660b could be the same eNB 660. The multiple Uu interfaces 539, 541 (e.g., multi-connectivity) can be achieved even by a single eNB 660. The UE 602 may be able to connect more than one Uux interface 541 (e.g., Uu1, Uu2, Uu3 . . . ). Each Uu interface 539, 541 can have carrier aggregation. Therefore, the UE 602 may be configured with more than one set of serving cells 651 in case of CA. In dual connectivity (i.e, two sets), one set of serving cells 651 may be the MCG 655, another set of serving cells may be the SCG 657.

Multiple Uu interfaces 539, 541 are described herein, but this functionality could be realized by a single Uu interface 539 depending on the definition of Uu interface 539. Multi-connectivity may be realized by a single Uu interface 539 or a single radio interface depending on the definition of the interface. A radio interface can be defined as an interface between a UE 602 and the E-UTRAN 633, but not an interface between the UE 602 and an eNB 660. For example, one radio interface can be defined as an interface between a UE 602 and the E-UTRAN 633 with multi-connectivity. Therefore, the difference between the Uu 539 and Uux 541 above may be considered as a characteristic of cells 651. The Uu interface 539 and the Uux interface 541 may be rephrased by a set A of cell(s) and a set B of cell(s), respectively. Also, a radio interface and an additional radio interface can be rephrased by a master cell group (MCG) 655 and secondary cell group (SCG) 657, respectively.

In some implementations, the E-UTRAN 633 may include a MeNB 660a and a SeNB 660b. The UE 602 may communicate with the MeNB 660a via a first radio connection 653a. The UE 602 may communicate with the SeNB 660b via the second radio connection 653b. While FIG. 6 depicts one first radio connection 653a and one second radio connection 653b, the UE 602 may be configured with one first radio connection 653a and one or more second radio connections 653b. The MeNB 660a and SeNB 660b may be implemented in accordance with the eNB 160 described in connection with FIG. 1.

The MeNB 660a may provide multiple cells 651a-c for connection to one or more UEs 602. For example, the MeNB 660a may provide cell A 651a, cell B 651b and cell C 651c. Similarly, the SeNB 660b may provide multiple cells 651d-f. The UE 602 may be configured to transmit/receive on one or more cells (e.g., cell A 651a, cell B 651b and cell C 651c)

for the first radio connection 653a (e.g., a master cell group (MCG) 655). The UE 602 may also be configured to transmit/receive on one or more other cells (e.g., cell D 651d, cell E 651e and cell F 651f) for the second radio connection 653b (e.g., a secondary cell group 657).

The MCG 655 may contain one PCell and one or more optional SCell(s). The SCG 657 may contain one PCell-like cell (that may be called PCell, primary SCell (PSCell), secondary PCell (SPCell), PCellscg, SCG PCell, etc.) and one or more optional SCell(s). If the UE 602 is configured to transmit/receive on multiple cells 651a-f for a radio connection 653a-b, a carrier aggregation operation may be applied to the radio connection 653a-b. In one configuration, each radio connection 653 may be configured with a primary cell and no, one, or more secondary cell(s). In another configuration, at least one radio connection 653 may be configured with a primary cell and no, one, or more secondary cell(s) and the other radio connections 653 may be configured with one or more secondary cell(s). In yet another configuration, at least one radio connection 653 may be configured with a primary cell and no, one, or more secondary cell(s) and the other radio connections 653 may be configured with a PCell-like cell and no, one or more secondary cell(s).

One MAC entity 661 and one PHY entity 663 may be mapped to one cell group. For example, a first MAC entity 661a and a first PHY entity 663a may be mapped to the MCG 655. Similarly, a second MAC entity 661b and a second PHY entity 663b may be mapped to the SCG 657. The UE 602 may be configured with one MCG 655 (e.g., the first radio connection 653a) and optionally one or more SCG(s) 657 (e.g., the second connection 653b).

The MeNB 660a manages and stores UE contexts for the first radio connection 653a. The UE contexts may be RRC contexts (e.g., configurations, configured cells 651, security information, etc.), QoS information and UE 602 identities for each UE 602 for configured cells 651 for the UE 602. For example, the MeNB 660a may manage and store a first UE context 643a, a second UE context 645 and a third UE context 647.

The SeNB 660b manages and stores UE contexts for the second radio connection 653b for each UE 602 for configured cells 651 for the UE 602. For example, the SeNB 660b may manages and store the first UE context 643b and a fourth UE context 649. An eNB 660 can behave as both MeNB 660a and SeNB 660b. Therefore, the eNB 660 may manage and store UE contexts for UEs 602 connected to a first radio connection 653a and UE contexts for UEs 602 connected to a second radio connection 653b.

In some implementations, the MAC entities 661a-b may have an interface with an RRC entity 659. The RRC entity 659 may receive RRC messages (e.g., RRC connection reconfiguration message, connection control message, handover command, etc.) from a RRC entity (not shown) of the E-UTRAN 633. The RRC entity 659 may also transmit RRC messages (e.g. RRC connection reconfiguration complete message) to the RRC entity (not shown) of the E-UTRAN 633.

Figure 7:
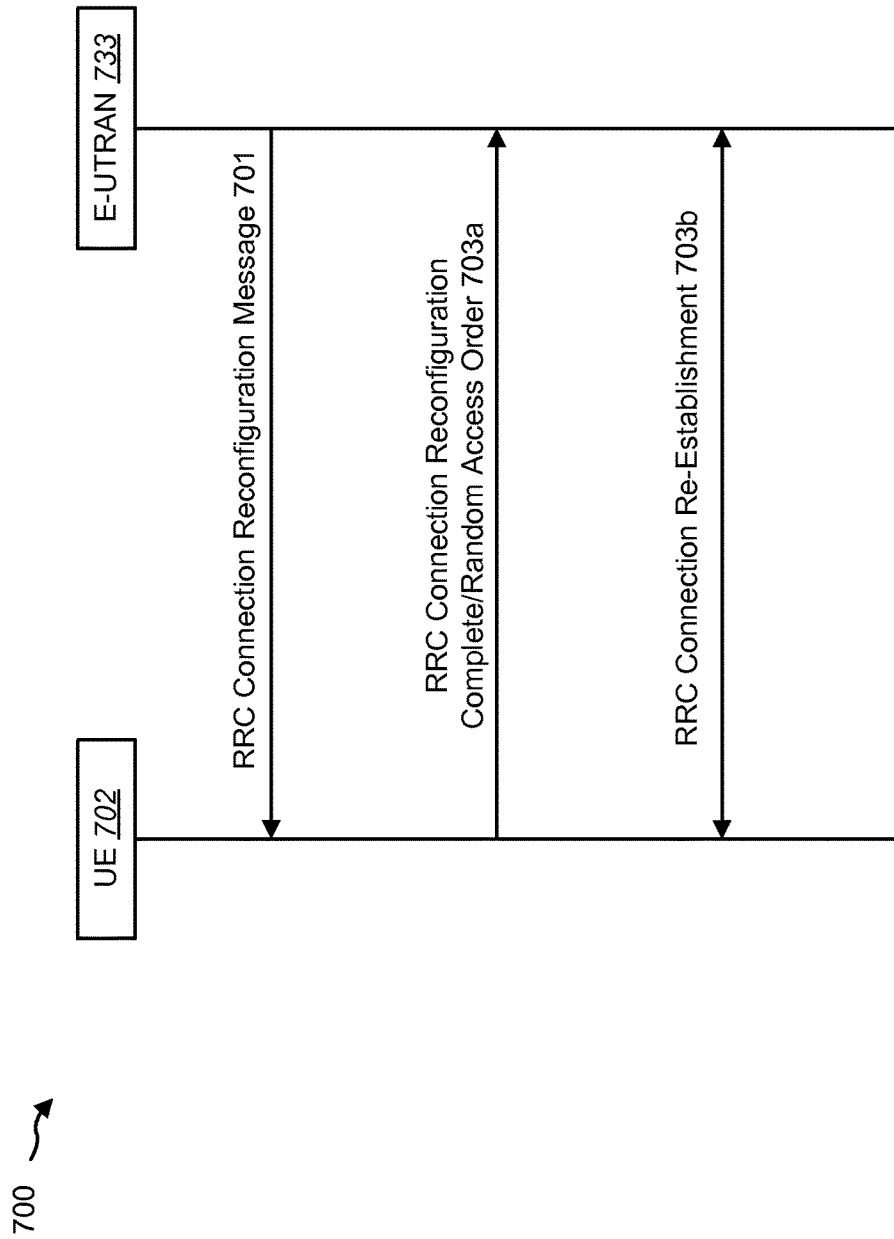
FIG. 7 is a thread diagram illustrating one configuration of an RRC connection reconfiguration procedure.

FIG. 7 is a thread diagram illustrating one configuration of an RRC connection reconfiguration procedure 700. The UE 702 described in connection with FIG. 7 may be implemented in accordance with the UE 102 described in connection with FIG. 1. The E-UTRAN 733 described in connection with FIG. 7 may be implemented in accordance with the E-UTRAN 633 described in connection with FIG. 6.

The purpose of the RRC connection reconfiguration procedure is to modify an RRC connection. For example, radio bearers (RBs) may be established, modified and released. A handover may be performed. Measurements may be setup, modified and released. Secondary cells (SCells) may be added, modified and released. Furthermore, a secondary cell group (SCG) 657 (which may also be referred to as an SeNB 660b) may be added, modified and released.

As part of the RRC connection reconfiguration procedure, non-access stratum (NAS) dedicated information may be transferred from the E-UTRAN 715 to the UE 702.

The E-UTRAN 733 may send 701 an RRC connection reconfiguration message to the UE 702. If the RRC connection reconfiguration message includes mobility control information 194, the UE 702 may perform a handover operation. This may be accomplished as described below in connection with FIG. 2. If the RRC connection reconfiguration message includes SCG configuration parameters 198 for SCG 657 addition, then the UE 702 may perform an SCG 657 addition procedure as described in connection with FIG. 3.

For a handover operation (e.g., the RRC connection reconfiguration message includes mobility control information 194), the UE 702 may send 703a an RRC connection reconfiguration complete message on the MCG 655 to the E-UTRAN 733. However, for SCG 657 addition (e.g., the RRC connection reconfiguration message includes SCG configuration parameters 198), the UE 702 does not submit any RRC message to lower layers of the SCG 657. Instead, the RRC 659 of the UE 702 may order 703a the MAC 661 of the SCG 657 of the UE 702 to initiate a random access procedure on the SCG 657. Parallel, before or after the RRC 659 of the UE 702 orders 703a the MAC 661 of the SCG 657 of the UE 702 to initiate a random access procedure on the SCG, the UE 702 may send 703a an RRC connection reconfiguration complete message on the MCG 655 to the E-UTRAN 733.

In the case of RRC connection reconfiguration failure, the UE 702 may attempt to re-establish 703b the RRC connection, which may involve the resumption of signaling radio bearer (SRB1) operation, the re-activation of security and the configuration of only the PCell.

Figure 8:
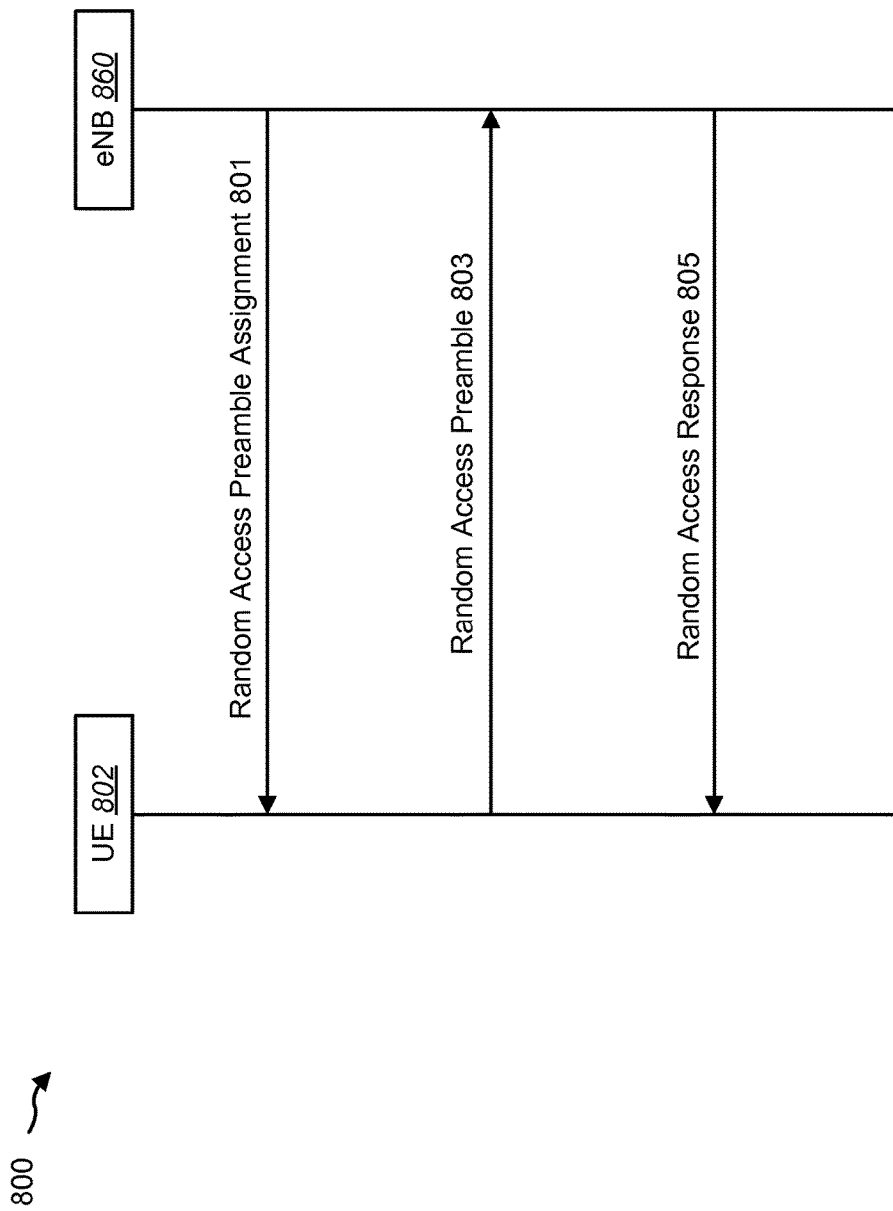
FIG. 8 is a thread diagram illustrating one configuration of a non-contention based random access procedure.

FIG. 8 is a thread diagram illustrating one configuration of a non-contention based random access procedure 800. The UE 802 described in connection with FIG. 8 may be implemented in accordance with the UE 102 described in connection with FIG. 1. The eNB 860 described in connection with FIG. 8 may be implemented in accordance with the eNB 160 described in connection with FIG. 1.

The eNB 860 may send 801 a random access preamble assignment. For example, the eNB 860 may assign the UE 802 a non-contention random access preamble (e.g., a dedicated random access preamble that is not within a set informed in broadcast signaling or a radio resource configuration common message). In some implementations, the eNB 860 may assign 801 the random access preamble via a dedicated signaling in a downlink (via a dedicated RACH preamble identity, for example) (message 0).

The UE 802 may then send 803 the assigned non-contention random access preamble to the eNB 860 (message 1). In some implementations, the UE 802 may send 803 the assigned non-contention random access preamble on a RACH in an uplink transmission.

The eNB 860 may then send 805 a random access response to the UE 802 (message 2). The random access response may be generated by the MAC on a downlink shared channel (DL-SCH). The UE 802 may receive the random access response. The random access response may include an uplink grant.

Figure 9:
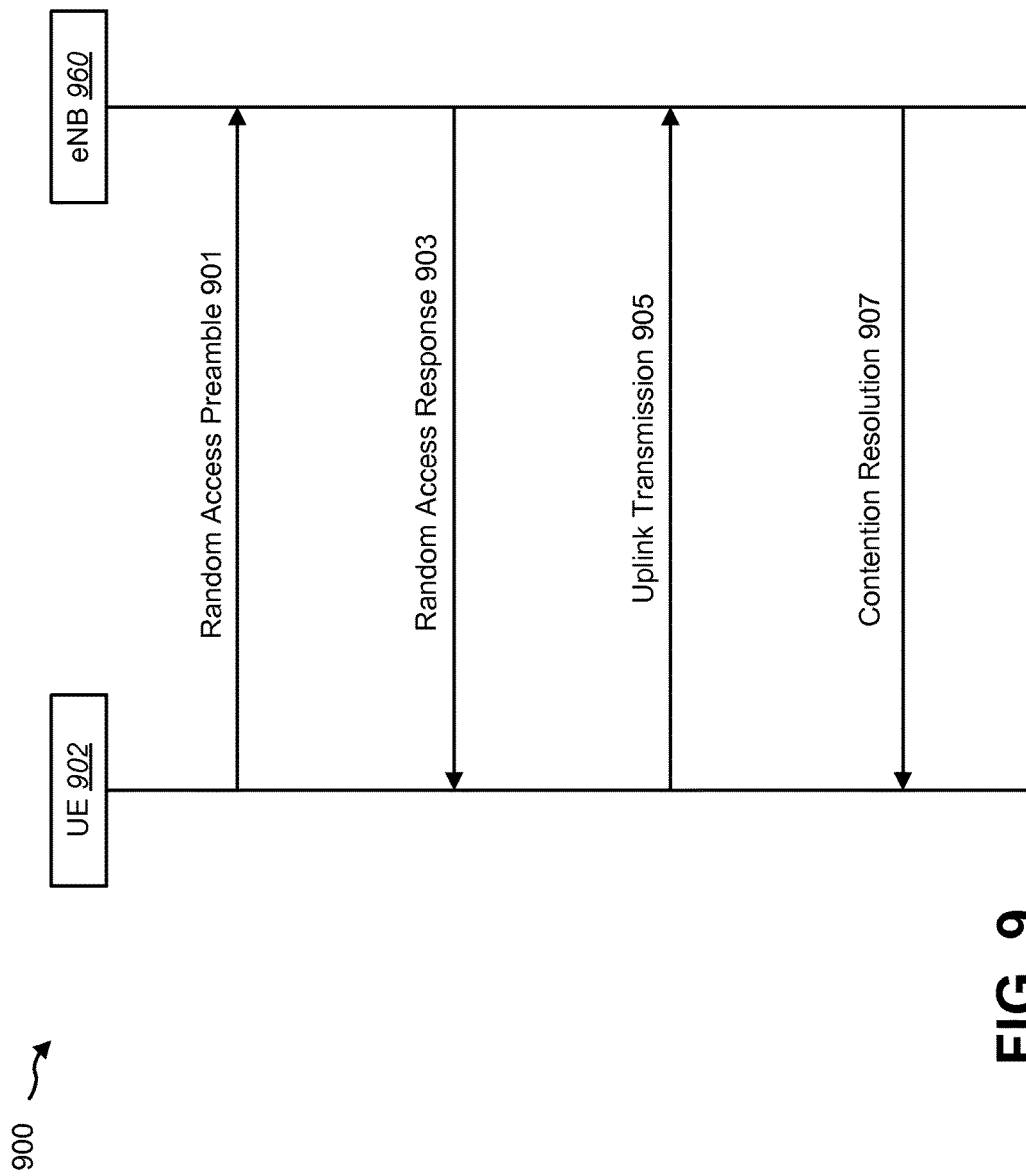
FIG. 9 is a thread diagram illustrating one configuration of a contention-based random access procedure.

FIG. 9 is a thread diagram illustrating one configuration of a contention-based random access procedure 900. The UE 902 described in connection with FIG. 9 may be implemented in accordance with the UE 102 described in connection with FIG. 1. The eNB 960 described in connection with FIG. 9 may be implemented in accordance with the eNB 160 described in connection with FIG. 1.

The UE 902 may select a random access preamble. For example, the UE 902 may select a random access preamble randomly from a set that is informed in broadcast signaling or a radio resource configuration common message. The UE 902 may then send 901 the randomly selected random access preamble to the eNB 960 (on a RACH in an uplink transmission, for example) (message 1).

The eNB 960 may send 903 a random access response (message 2). The UE 902 may receive the random access response. The random access response may include a temporary C-RNTI and an uplink grant. The random access response may be generated by the MAC on the DL-SCH.

The UE 902 may then send 905 an Msg3 on a scheduled uplink resource on an UL-SCH (message 3, Msg3). In other words, the UE 902 may transmit 905 the Msg3 on an uplink resource scheduled by the uplink grant received in the random access response or retransmit the Msg3 on an uplink resource scheduled by PDCCH addressed to the temporary C-RNTI. In one configuration, an Msg3 message may include at least a C-RNTI MAC CE or a CCCH SDU. If the random access procedure is within a RRC connection establishment procedure, an Msg3 message includes at least the CCCH SDU. If the RRC order initiates the random access procedure, an Msg3 message includes at least a C-RNTI MAC CE. In case of the RRC order, the Msg3 message may include a special MAC CE for reconfiguration complete indication to the SeNB.

Once the Msg3 is transmitted, the UE 902 may start a contention resolution timer (e.g., mac-ContentionResolutionTimer). The contention resolution timer may specify the number of consecutive subframe(s) during which the UE 902 may monitor the PDCCH after the Msg3 is transmitted. The contention resolution timer may run once it is started, until it is stopped or until it expires, otherwise the contention resolution timer is not running. The contention resolution timer may be started if it is not running or restarted if it is running. The contention resolution timer may be started or restarted from its initial value. The UE 902 may restart the contention resolution timer at each hybrid automatic repeat request (HARQ) retransmission. Regardless of the possible occurrence of a measurement gap, the UE 902 may monitor the PDCCH until the contention resolution timer expires or is stopped.

The eNB 960 may send 907 a contention resolution, which may be received by the UE 902. The contention resolution may be sent 907 on the PDCCH. The contention resolution may include information that confirms that the UE 902 is identified. The lower layers (e.g., PHY layer) of the UE 902 may provide notification of the reception of the PDCCH transmission.

In a case that notification of a reception of a PDCCH transmission is received from lower layers and the C-RNTI MAC control element was included in Msg3, if the random access procedure was initiated by the MAC sublayer itself or an RRC order and the PDCCH transmission is addressed to the C-RNTI and contains an UL grant for a new transmission, then the UE 902 may consider the contention resolution successful. The UL grant is a scheduling command for PUSCH. For each HARQ process, the UL grant may provide PUSCH resource assignment and indication of new transmission or retransmission. The UE 902 may stop the contention resolution timer. The UE 902 may discard the temporary C-RNTI. The UE 902 may also consider the random access procedure successfully completed.

In the case that notification of a reception of a PDCCH transmission is received from lower layers and the C-RNTI MAC control element was included in Msg3, if the random access procedure was initiated by a PDCCH order and the PDCCH transmission is addressed to the C-RNTI, then the UE 902 may consider the contention resolution successful. The UE 902 may stop the contention resolution timer. The UE 902 may discard the temporary C-RNTI. The UE 902 may also consider the random access procedure successfully completed.

Figure 10:
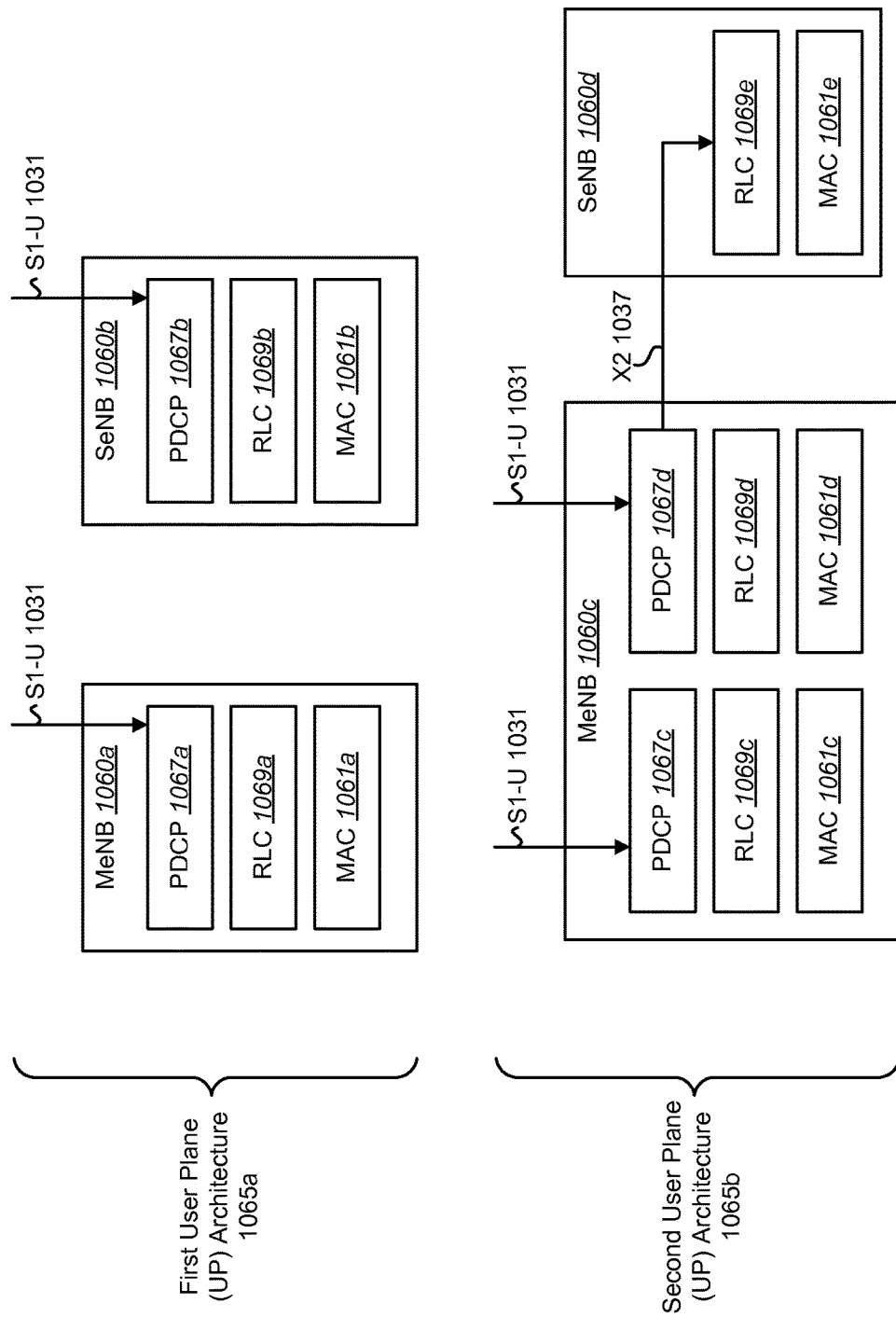
FIG. 10 is a block diagram illustrating a first user plane (UP) architecture and a second UP architecture.

FIG. 10 is a block diagram illustrating a first user plane (UP) architecture 1065a and a second UP architecture 1065b. In the first UP architecture 1065a, the S1-U interface 1031 terminates at an MeNB 1060a and an SeNB 1060b. The UP of the MeNB 1060a includes a PDCP 1067a an RLC 1069a and a MAC 1061a. The UP of the SeNB 1060b includes a PDCP 1067b an RLC 1069b and a MAC 1061b. In the first UP architecture 1065a, the PDCP 1067a of the MeNB 1060a is independent of the PDCP 1067b of the SeNB 1060b. In other words, for the first UP architecture 1065a there is no bearer split.

In the second UP architecture 1065b, the S1-U interface 1031 terminates at the MeNB 1060c. The UP of the MeNB 1060c includes a first PDCP 1067c and second PDCP 1067d, a first RLC 1069c and second RLC 1069d and a first MAC 1061c and second MAC 1061d. The UP of the SeNB 1060b includes an RLC 1069e and a MAC 1061e. In the second UP architecture 1065b, the second PDCP 1067d of the MeNB 1060c is coupled to the RLC 1069e of the SeNB 1060b via an X2 interface 1037. In other words, for the second UP architecture 1065a there is a bearer split. However, the second UP architecture 1065b has independent RLCs 1069 for the split bearers.

Both a contention-free random access procedure (as described in connection with FIG. 8) and a contention-based random access procedure (as described in connection with FIG. 9) are supported towards the SeNB 1060b,d. The random access response message is sent from the eNB 1060 to which the random access preamble was sent. A parallel random access procedure is supported if the random access preamble transmission is not overlapped. There is no requirement to coordinate physical random access channel (PRACH) resources in the network side.

For both MAC entities 1061 of the MeNB 1060a,c (e.g., the MCG 655) and the SeNB 1060b,d (e.g., the SCG 657), the random access procedure is initiated by a PDCCH order or by the MAC sublayer itself. If this is a MAC entity of the SCG 657, the random access procedure may also be initiated by an RRC order as well.

A random access procedure on an SCell may only be initiated by a PDCCH order. If a UE 102 receives a PDCCH transmission consistent with a PDCCH order masked with its C-RNTI, and for a specific serving cell 651, the UE 102 may initiate a random access procedure on the serving cell.

For random access on the PCell and the PCell-like cell, a PDCCH order or an RRC optionally indicate the ra-PreambleIndex and the ra-PRACH-MaskIndex. For random access on an SCell, the PDCCH order indicates the ra-PreambleIndex with a value different from 000000 and the ra-PRACH- MaskIndex. The pTAG preamble transmission on PRACH and reception of a PDCCH order may be supported for the PCell and the PCell-like cell.

For an eNB 1060 specific bearer, where the bearer is mapped into either the MeNB 1060*a*,*c* or the SeNB 1060*b*,*d*, the UE 102 may send BSR information related to the specific bearer towards the eNB 1060 to which the corresponding bearer belongs. Separate discontinuous reception (DRX) configurations may be supported for the MeNB 1060*a*,*c* and the SeNB 1060*b*,*d* and separate DRX operations (e.g., timers and active time) should be allowed for MeNB 1060*a*,*c* and SeNB 1060*b*,*d*. From a UE power consumption point of view, DRX coordination would be beneficial for UE 102 power consumption.

Activation and deactivation are supported for the SCG 657. The MeNB 1060*a*,*c* can activate and deactivate cells 651 associated with the MeNB 1060*a*,*c*. The SeNB 1060*b*,*d* can activate and deactivate cells 651 associated with the SeNB 1060*b*,*d*. The MAC entity 661 of the UE 102 may be configured per cell group (e.g., one MAC 661 for the MCG 655 and the other MAC 661 for the SCG 657).

In one configuration, the maximum number of serving cells 651 per UE 102 for carrier aggregation is 5. Carrier aggregation may be supported in the MeNB 1060*a*,*c* and the SeNB 1060*b*,*d*. In other words, the MeNB 1060*a*,*c* and the SeNB 1060*b*,*d* may have multiple serving cells 651 for a UE 102. In multi-connectivity, a UE 102 may be connected to one MeNB 1060*a*,*c* and one SeNB 1060*b*,*d*. A timing advance group (TAG) may only comprise cells 651 of one eNB 1060. In one configuration, the maximum number of TAGs per UE 102 for carrier aggregation is 4. In one configuration, the MCG 655 and the SCG 657 may operate either in the same or in different duplex schemes.

The SeNB 1060*b*,*d* may have one special cell 651 (e.g., PCell-like cell) containing at least PUCCH functionality, and potentially also some other PCell functionality. However, it is not necessary to duplicate all PCell functionality for the special cell 651. For the special cell 651 in the SCG 657, there is no need to provide NAS security and NAS mobility functions in the SeNB 1060*b*,*d*. At least one cell 651 in the SeNB 1060*b*,*d* has configured UL and one cell 651 is configured with PUCCH resources.

No radio link monitoring (RLM) is needed on a cell 651 not carrying PUCCH in the SeNB 1060*b*,*d*. Radio link failure (RLF), if supported, of any cell 651 of the SCG 657 does not trigger RRC connection re-establishment. The cell 651 in the SeNB 1060*b*,*d* which is configured with PUCCH resources may not be cross-carrier scheduled.

The first UP architecture 1065*a* and the second user plane architecture 1065*b* may be implemented by RRC configuration. Deviations in the protocol stack for different configurations should be limited. For instance, a new specification of PDCP-SeNB should be not introduced. In one configuration, some bearers of a UE 102 may be split (as in the second UP architecture 1065*b*) while other bearers are only served by the MeNB 1060*a*,*c*. In another configuration, some bearers of a UE 102 may be served by the SeNB 1060*b*,*d* (as in the first UP architecture 1065*a*) while others are only served by the MeNB 1060*a*,*c*. RLC status PDUs may transmitted to corresponding eNBs 1060 via the corresponding Uu interface 539 or Uux interface 541.

FIG. 11 is a thread diagram illustrating one configuration of SeNB 1160*b* addition and modification 1100. The UE 1102 described in connection with FIG. 11 may be implemented in accordance with the UE 102 described in connection with FIG. 1. The MeNB 1160*a* and the SeNB 1160*b* described in connection with FIG. 11 may be implemented in accordance with the eNB 160 described in connection with FIG. 1. FIG. 11 depicts the overall signaling scheme for the addition and modification of SeNB 1160*b* resources (e.g., SCG addition) for multi-connectivity operation. It should be noted that this signaling scheme illustrates the similarities between addition and modification signaling schemes. S1-MME 529 and X2-C 537 signaling that is relevant only for the first UP architecture 1065*a* is shown with dashed lines (steps 1111, 1113 and 1121-1125). It is assumed that the S-GW 1127 does not change.

The MeNB 1160*a* may decide 1101*a* to request the SeNB 1160*b* to add or modify radio resources for a specific E-UTRAN radio access bearer (E-RAB). The decision 1101*a* to request the SeNB 1160*b* to add or modify radio resources may be a radio resource management (RRM) decision. Alternatively, the SeNB 1160*b* may decide 1101*b* to modify radio resources for a specific E-RAB. The decision 1101*b* to modify radio resources may be an RRM decision. In one implementation, the SeNB 1160*b* and the MeNB 1160*a* may coordinate to ensure that the capabilities of the UE 1102 are not exceeded.

If the MeNB 1160*a* initiates the SeNB 1160*b* addition or modification, the MeNB 1160*a* may send 1103 an SeNB addition/modification request to the SeNB 1160*b* to allocate or modify radio resources. The SeNB addition/modification request may include E-RAB characteristics (e.g., E-RAB parameters and transport network layer (TNL) address information corresponding to an UP architecture 1065), UE 1102 capabilities, the current radio resource configuration of the UE 1102, etc. The RRM of the SeNB 1160*b* may decide 1105 whether to admit the resource request. If the RRM entity in the SeNB 1160*b* is able to admit the resource request, then the SeNB 1160*b* may configure the respective radio resources and respective transport network resources (based on the UP architecture 1065). The SeNB 1160*b* may also allocate a dedicated RACH preamble for the UE 1102 so that synchronisation of the SeNB 1160*b* radio resource configuration may be performed.

The SeNB 1160*b* may send 1107 an SeNB addition/ modification command to the MeNB 1160*a*. For example, the SeNB 1160*b* may provide the new radio resource configuration to the MeNB 1160*a*. For the first UP architecture 1065*a*, the SeNB addition/modification command may include S1 interface DL TNL address information for the respective E-RAB. For the second UP architecture 1065*b*, the SeNB addition/modification command may include X2 interface DL TNL address information.

The MeNB 1160*a* may endorse the new radio resource configuration and may trigger the UE 1102 to apply it. The MeNB 1160*a* may send 1109 an RRC connection reconfiguration message (e.g., an RRC connection reconfiguration message that includes SCG configuration parameters 198 for SCG addition) to the UE 1102. The UE 1102 may start to apply the new radio resource configuration.

In the case of the first UP architecture 1065*a*, the MeNB 1160*a* may, dependent on respective E-RAB characteristics, take actions to minimise service interruption due to activation of multi-connectivity. The MeNB 1160*a* may send 1111 a sequence number (SN) status report to the SeNB 1160*b*. The MeNB 1160*a* may perform 1113 data forwarding to the SeNB 1160*b*. In one configuration, the UP resources established for data forwarding for the first UP architecture 1065*a* may be released explicitly.

Upon completing the reconfiguration procedure, the UE 1102 may send 1115 an RRC connection reconfiguration complete message to the MeNB 1160*a*. The UE 1102 may perform synchronisation towards a cell 651 of the SeNB

1160*b*. For example, the UE 1102 may perform 1117 a random access procedure with the SeNB 1160*b*, if needed. The RRC connection reconfiguration complete message may be sent 1115 after the synchronisation procedure 1117 or may be before the synchronisation procedure 1117. In the case of the second UP architecture 1065*b*, transmission of user plane data from the SeNB 1160*b* to the UE 1102 may take place after step 1115 or 1117 depending on the synchronisation procedure.

The SeNB 1160*b* may send 1119 a SeNB addition/modification complete message to the MeNB 1160*a*. The SeNB 1160*b* reports to the MeNB 1160*a* the detection of synchronisation with the UE 1102, confirming that the new configuration is in use. Receipt of the SeNB addition/modification complete message by the MeNB 1160*a* successfully completes the overall SeNB addition/modification procedure on the X2 interface. Step 1119 may be either necessary as described above or in the reverse direction (from MeNB 1160*a* to SeNB 1160*b*).

In the case of the first UP architecture 1065*a*, an update of the UP path towards the EPC 523 may be performed. The MeNB 1160*a* may send 1121 an E-RAB modification indication to the MME 1134. The MME 1134 and the S-GW 1127 may perform 1123 bearer modification. The MME 1134 may send 1125 an E-RAB modification confirmation to the MeNB 1160*a*.

Figure 12:
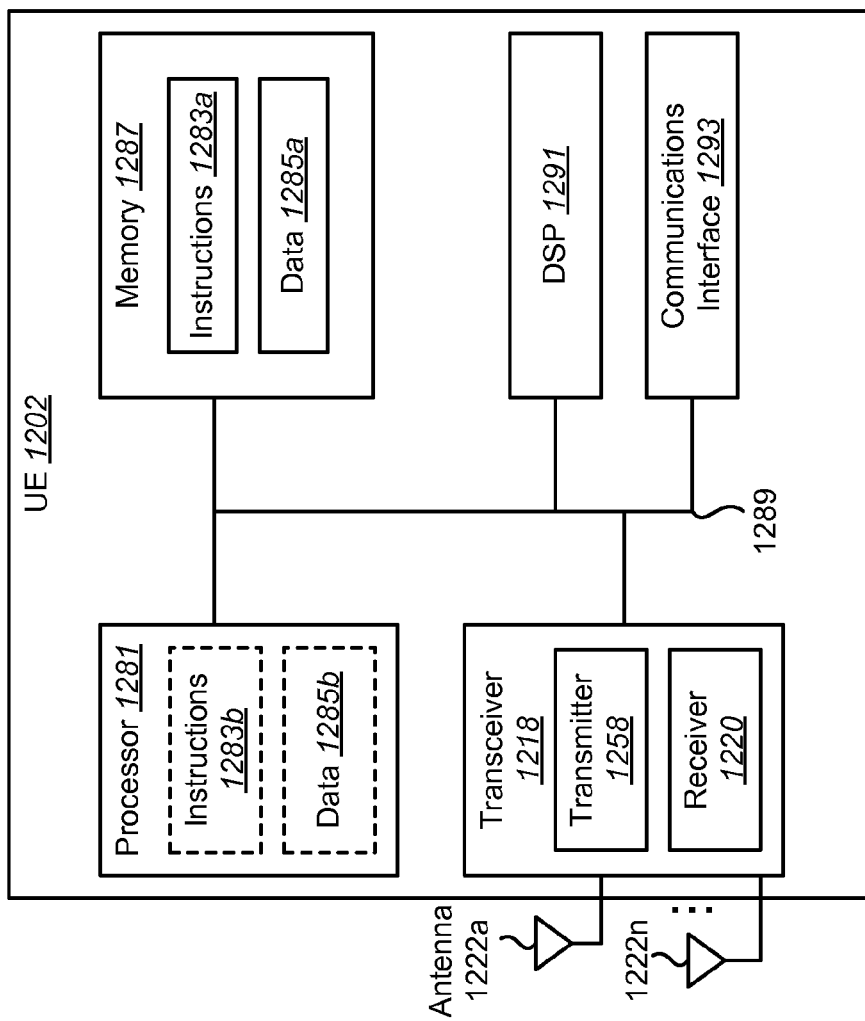
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1281 that controls operation of the UE 1202. The processor 1281 may also be referred to as a central processing unit (CPU). Memory 1287, which may include read-only memory (ROM), random access memory (RAM), a combination of the two or any type of device that may store information, provides instructions 1283*a* and data 1285*a* to the processor 1281. A portion of the memory 1287 may also include non-volatile random access memory (NVRAM). Instructions 1283*b* and data 1285*b* may also reside in the processor 1281. Instructions 1283*b* and/or data 1285*b* loaded into the processor 1281 may also include instructions 1283*a* and/or data 1285*a* from memory 1287 that were loaded for execution or processing by the processor 1281. The instructions 1283*b* may be executed by the processor 1281 to implement one or more of the methods 200 and 300 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222*a-n* are attached to the housing and electrically coupled to the transceiver 1218.

The various components of the UE 1202 are coupled together by a bus system 1289, which may include a power bus, a control signal bus and a status signal bus, in addition to a data bus. However, for the sake of clarity, the various buses are illustrated in FIG. 12 as the bus system 1289. The UE 1202 may also include a digital signal processor (DSP) 1291 for use in processing signals. The UE 1202 may also include a communications interface 1293 that provides user access to the functions of the UE 1202. The UE 1202 illustrated in FIG. 12 is a functional block diagram rather than a listing of specific components.

Figure 13:
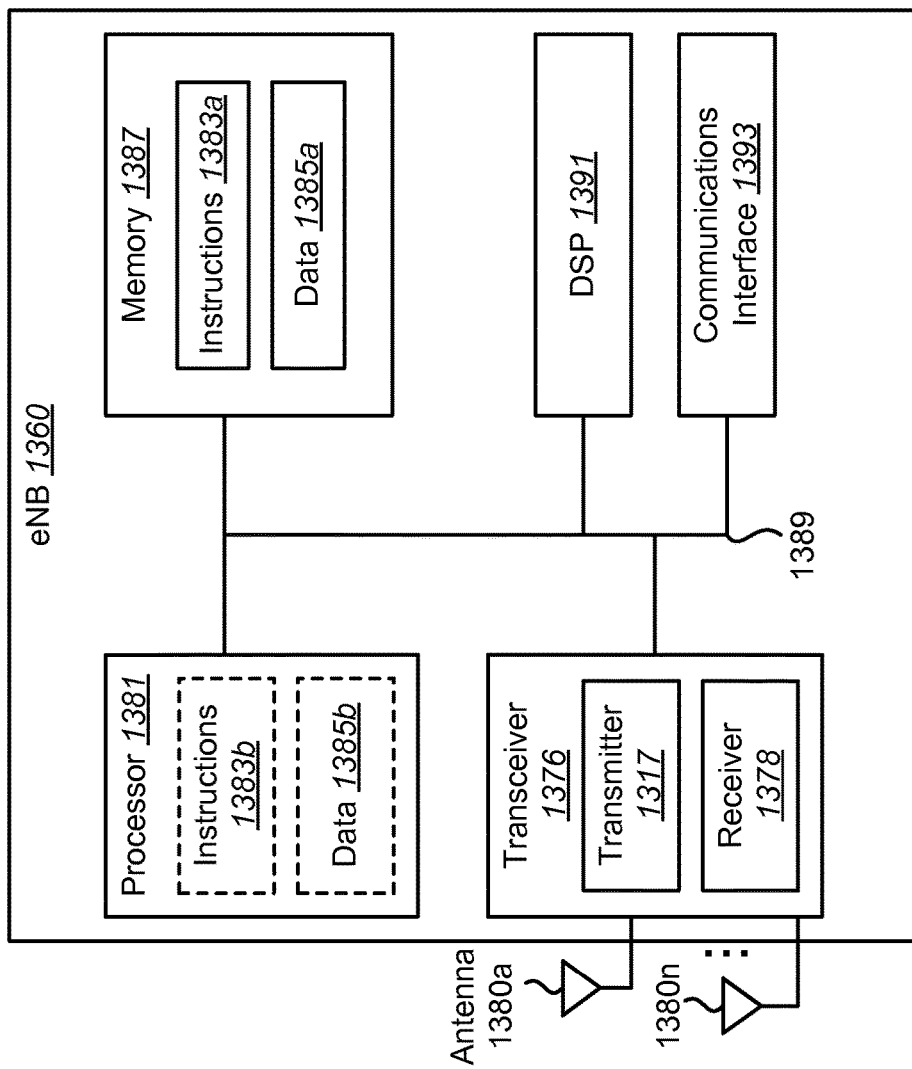
FIG. 13 illustrates various components that may be utilized in an eNB.

FIG. 13 illustrates various components that may be utilized in an eNB 1360. The eNB 1360 described in connection with FIG. 13 may be implemented in accordance with the eNB 160 described in connection with FIG. 1. The eNB 1360 includes a processor 1381 that controls operation of the eNB 1360. The processor 1381 may also be referred to as a central processing unit (CPU). Memory 1387, which may include read-only memory (ROM), random access memory (RAM), a combination of the two or any type of device that may store information, provides instructions 1383*a* and data 1385*a* to the processor 1381. A portion of the memory 1387 may also include non-volatile random access memory (NVRAM). Instructions 1383*b* and data 1385*b* may also reside in the processor 1381. Instructions 1383*b* and/or data 1385*b* loaded into the processor 1381 may also include instructions 1383*a* and/or data 1385*a* from memory 1387 that were loaded for execution or processing by the processor 1381. The instructions 1383*b* may be executed by the processor 1381 to implement method 400 described above.

The eNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380*a-n* are attached to the housing and electrically coupled to the transceiver 1376.

The various components of the eNB 1360 are coupled together by a bus system 1389, which may include a power bus, a control signal bus and a status signal bus, in addition to a data bus. However, for the sake of clarity, the various buses are illustrated in FIG. 13 as the bus system 1389. The eNB 1360 may also include a digital signal processor (DSP) 1391 for use in processing signals. The eNB 1360 may also include a communications interface 1393 that provides user access to the functions of the eNB 1360. The eNB 1360 illustrated in FIG. 13 is a functional block diagram rather than a listing of specific components.

Figure 14:
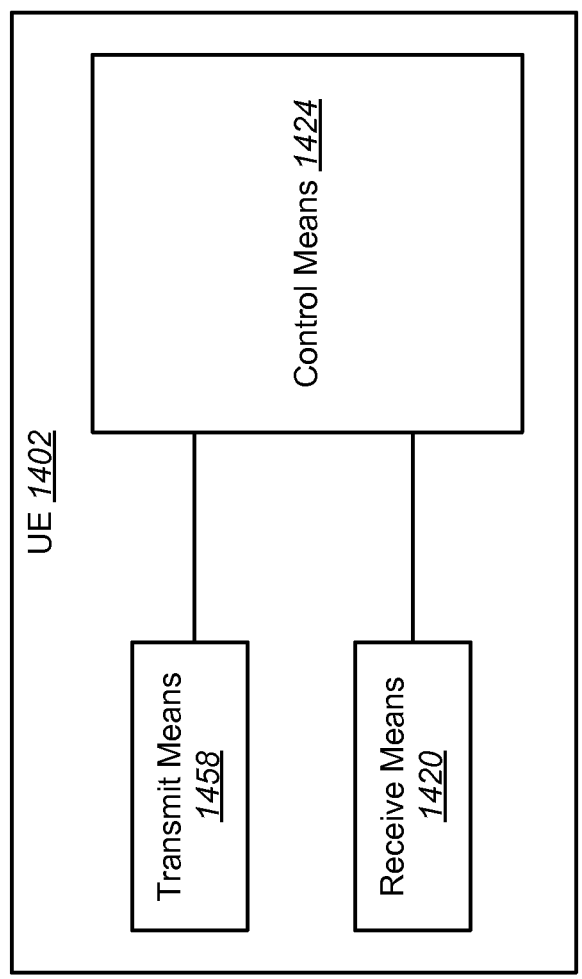
FIG. 14 is a block diagram illustrating one configuration of a UE in which systems and methods for sending feedback information may be implemented.

FIG. 14 is a block diagram illustrating one configuration of a UE 1402 in which systems and methods for sending feedback information may be implemented. The UE 1402 includes transmit means 1458, receive means 1420 and control means 1424. The transmit means 1458, receive means 1420 and control means 1424 may be configured to perform one or more of the functions described in connection with FIG. 2 and FIG. 3 above. FIG. 12 above illustrates one example of a concrete apparatus structure of FIG. 14. Other various structures may be implemented to realize one or more of the functions of FIG. 2 and FIG. 3. For example, a DSP may be realized by software.

Figure 15:
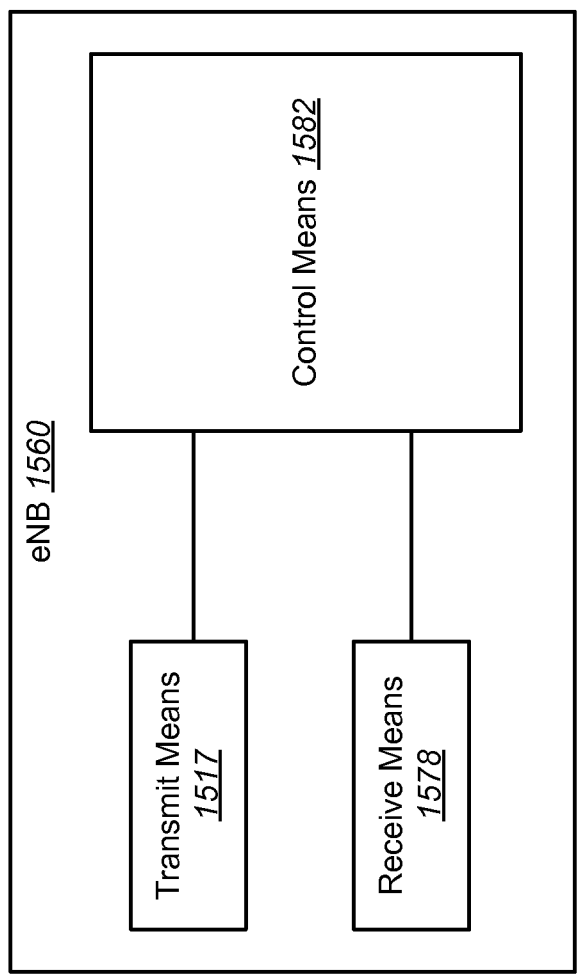
FIG. 15 is a block diagram illustrating one configuration of an eNB in which systems and methods for receiving feedback information may be implemented.

FIG. 15 is a block diagram illustrating one configuration of an eNB 1560 in which systems and methods for receiving feedback information may be implemented. The eNB 1560 includes transmit means 1517, receive means 1578 and control means 1582. The transmit means 1517, receive means 1578 and control means 1582 may be configured to perform one or more of the functions described in connection with FIG. 4 above. FIG. 13 above illustrates one example of a concrete apparatus structure of FIG. 15. Other various structures may be implemented to realize one or more of the functions of FIG. 4. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for receiving a radio resource control (RRC) message by a user equipment (UE), comprising:
   receiving an RRC connection reconfiguration message including mobility control information;
   starting synchronizing to a downlink of a target primary cell (PCell) in a case that the RRC connection reconfiguration message including the mobility control information is received; and
   resetting a medium access control (MAC) entity of a master cell group (MCG) and a MAC entity of a secondary cell group (SCG) if any MAC entity of the SCG is configured in the case that the RRC connection reconfiguration message including the mobility control information is received,
   wherein the MAC entity of the MCG and the MAC entity of the SCG are configured for the UE, the MCG includes at least one PCell, and the SCG includes at least one primary SCell (PSCell).

2. The method of claim 1, further comprising re-establishing radio link control (RLC) entities of the MCG for all radio bearers (RBs) that are established in the case that the RRC connection reconfiguration message including the mobility control information is received.

3. The method of claim 1, further comprising releasing radio link control (RLC) entities of the SCG for all radio bearers (RBs) that are established, if any RLC entity of the SCG is established in the case that the RRC connection reconfiguration message including the mobility control information is received.

4. The method of claim 1, further comprising re-establishing packet data convergence protocol (PDCP) entities for all radio bearers (RBs) that are established for the MCG in the case that the RRC connection reconfiguration message including the mobility control information is received.

5. The method of claim 1, further comprising releasing packet data convergence protocol (PDCP) entities for all radio bearers (RBs) that are established for the SCG, if any PDCP entity of the SCG is established in the case that the RRC connection reconfiguration message including the mobility control information is received.

6. A user equipment (UE) for receiving a radio resource control (RRC) message, comprising:
   a processor; and
   memory in electronic communication with the processor, wherein instructions stored in the memory are executable to:
   receive an RRC connection reconfiguration message including mobility control information;
   start synchronizing to a downlink of a target primary cell (PCell) in a case that the RRC connection reconfiguration message including the mobility control information is received; and
   reset a medium access control (MAC) entity of a master cell group (MCG) and MAC entity of a secondary cell group (SCG) if any MAC entity of the SCG is configured in the case that the RRC connection reconfiguration message including the mobility control information is received,
   wherein the MAC entity of the MCG and the MAC entity of the SCG are configured for the UE, the MCG includes at least one PCell, and the SCG includes at least one primary SCell (PSCell).

7. The UE of claim 6, wherein the instructions are further executable to re-establish radio link control (RLC) entities for all radio bearers (RBs) that are established for the MCG in the case that the RRC connection reconfiguration message including the mobility control information is received.

8. The UE of claim 6, wherein the instructions are further executable to release radio link control (RLC) entities for all radio bearers (RBs) that are established for the SCG, if any RLC entity of the SCG is established in the case that the RRC connection reconfiguration message including the mobility control information is received.

9. The UE of claim 6, wherein the instructions are further executable to reestablish packet data convergence protocol (PDCP) entities for all radio bearers (RBs) that are established for the MCG in the case that the RRC connection reconfiguration message including the mobility control information is received.

10. The UE of claim 6, wherein the instructions are further executable to release packet data convergence protocol (PDCP) entities for all radio bearers (RBs) that are established for the SCG, if any PDCP entity of the SCG is established in the case that the RRC connection reconfiguration message including the mobility control information is received.

11. A non-transitory, tangible computer-readable medium for receiving radio resource control (RRC) message by a user equipment (UE), comprising executable instructions for:
   receiving an RRC connection reconfiguration message including mobility control information;
   starting synchronizing to a downlink of a target primary cell (PCell) in a case that the RRC connection reconfiguration message including the mobility control information is received; and
   resetting a medium access control (MAC) entity of a master cell group (MCG) and MAC entity of a secondary cell group (SCG) if any MAC entity of the SCG is configured in the case that the RRC connection reconfiguration message including the mobility control information is received,
   wherein the MAC entity of the MCG and the MAC entity of the SCG are configured for the UE, the MCG includes at least one PCell, and the SCG includes at least one primary SCell (PSCell).

12. The computer-readable medium of claim 11, wherein the computer-readable medium further comprises executable instructions for re-establishing radio link control (RLC) entities for all radio bearers (RBs) that are established for the MCG in the case that the RRC connection reconfiguration message including the mobility control information is received.

13. The computer-readable medium of claim 11, wherein the computer-readable medium further comprises executable instructions for releasing radio link control (RLC) entities for all radio bearers (RBs) that are established for the SCG, if any RLC entity of the SCG is established in the case that the RRC connection reconfiguration message including the mobility control information is received.

14. The computer-readable medium of claim 11, wherein the computer-readable medium further comprises executable instructions for re-establishing packet data convergence protocol (PDCP) entities for all radio bearers (RBs) that are established for the MCG in the case that the RRC connection reconfiguration message including the mobility control information is received.

15. The computer-readable medium of claim 11, wherein the computer-readable medium further comprises executable instructions for releasing packet data convergence protocol (PDCP) entities for all radio bearers (RBs) that are established for the SCG, if any PDCP entity of the SCG is established in the case that the RRC connection reconfiguration message including the mobility control information is received.

* * * * *